(12) United States Patent
Krall et al.

(10) Patent No.: US 12,306,471 B2
(45) Date of Patent: May 20, 2025

(54) PRISMATIC CONTACT LENS

(71) Applicant: Neurolens, Inc., Coppell, TX (US)

(72) Inventors: Jeffrey P. Krall, Mitchell, SD (US); Aric Plumley, Huntington Beach, CA (US)

(73) Assignee: Neurolens, Inc., Coppell, TX (US)

( * ) Notice: Subject to any disclaimer, the term of this patent is extended or adjusted under 35 U.S.C. 154(b) by 527 days.

(21) Appl. No.: 17/393,402

(22) Filed: Aug. 3, 2021

(65) Prior Publication Data

US 2022/0030406 A1 Jan. 27, 2022

Related U.S. Application Data

(63) Continuation of application No. 15/399,746, filed on Jan. 6, 2017, now abandoned.

(51) Int. Cl.
*G02C 7/04* (2006.01)
*G02C 7/14* (2006.01)

(52) U.S. Cl.
CPC ............... *G02C 7/041* (2013.01); *G02C 7/14* (2013.01)

(58) Field of Classification Search
CPC ............ G02C 7/04; G02C 7/041; G02C 7/14
See application file for complete search history.

(56) References Cited

U.S. PATENT DOCUMENTS

| 3,245,745 | A | 4/1966 | Hancock |
| 4,056,311 | A | 11/1977 | Winthrop |
| 4,222,639 | A | 9/1980 | Sheedy |
| 4,240,719 | A | 12/1980 | Gunter et al. |
| 4,253,747 | A | 3/1981 | Maitenaz |
| 4,580,882 | A | 4/1986 | Nuchman et al. |
| 4,580,883 | A | 4/1986 | Shinohara |
| 4,606,626 | A | 8/1986 | Shinohara |
| 4,756,305 | A | 7/1988 | Mateik et al. |
| 4,906,090 | A | 3/1990 | Barth |
| 4,961,639 | A | 10/1990 | Lazarus |
| 5,026,151 | A | 6/1991 | Waltuck et al. |

(Continued)

FOREIGN PATENT DOCUMENTS

| CN | 1438852 A | 8/2003 |
| CN | 103815866 A | 5/2014 |

(Continued)

OTHER PUBLICATIONS

Evans, Bruce J.W., "Optometric Prescribing for Decompensated Heterophoria," Optometry in Practice, vol. 9, 2008, pp. 63-78.

(Continued)

*Primary Examiner* — Ephrem Z Mebrahtu

(57) ABSTRACT

A class of prismatic contact lenses includes a first prism zone, having a first prism and a first optical power; and a progressive prism zone, adjacent to the first prism zone, having a progressive prism that varies from the first prism to a second prism. The prismatic contact lens can further comprise a second prism zone, adjacent to the progressive prism zone, having the second prism and a second optical power. Another class of prismatic contact lenses include a first prism zone, having a first prism and a first optical power; a second prism zone, adjacent to the first prism zone, having a second prism and a second optical power; and a sharp transition between the first prism zone and the second prism zone.

9 Claims, 23 Drawing Sheets

(56) References Cited

U.S. PATENT DOCUMENTS

| | | | |
|---|---|---|---|
| 5,200,859 A | 4/1993 | Payner et al. | |
| 5,305,028 A | 4/1994 | Okano | |
| 5,381,191 A | 1/1995 | Levy | |
| 5,517,260 A * | 5/1996 | Glady | G02C 7/063 351/159.42 |
| 5,557,348 A | 9/1996 | Umeda et al. | |
| 5,724,120 A | 3/1998 | Svochak et al. | |
| 5,728,156 A | 3/1998 | Gupta et al. | |
| 5,782,894 A | 7/1998 | Israel | |
| 5,946,075 A | 8/1999 | Horn | |
| 5,969,790 A | 10/1999 | Onufryk | |
| 6,019,470 A | 2/2000 | Makalyama et al. | |
| 6,062,691 A | 5/2000 | Markson | |
| 6,106,819 A | 8/2000 | Sucher | |
| 6,142,624 A | 11/2000 | Morris et al. | |
| 6,318,857 B1 | 11/2001 | Shirayanagi | |
| 6,347,869 B1 | 2/2002 | Xu et al. | |
| 6,364,481 B1 | 4/2002 | O'Conner et al. | |
| 6,505,934 B1 | 1/2003 | Menezes | |
| 6,547,387 B1 | 4/2003 | Katsantones | |
| 6,579,478 B2 | 6/2003 | Lossman et al. | |
| 6,652,097 B2 | 11/2003 | Shirayanagi | |
| 6,776,486 B2 | 8/2004 | Steele et al. | |
| 6,789,895 B2 * | 9/2004 | Shirayanagi | G02C 7/02 351/159.01 |
| 6,789,898 B2 | 9/2004 | Le Saux et al. | |
| 6,871,954 B2 | 3/2005 | Copeland | |
| 6,956,682 B2 | 10/2005 | Wooley | |
| 7,104,647 B2 | 9/2006 | Krall | |
| 7,216,977 B2 | 5/2007 | Poulain et al. | |
| 7,290,878 B1 | 11/2007 | Hofeldt | |
| 7,703,921 B2 | 4/2010 | Dick et al. | |
| 7,828,439 B2 | 11/2010 | Krall | |
| 7,976,157 B2 | 7/2011 | Croft et al. | |
| 8,042,940 B2 | 10/2011 | Krall et al. | |
| 8,100,529 B2 | 1/2012 | Kozu | |
| 8,287,124 B2 | 10/2012 | Krall et al. | |
| 8,376,546 B2 | 2/2013 | Kozu | |
| 8,425,034 B2 | 4/2013 | Wietschorke | |
| 9,237,843 B1 | 1/2016 | Krall et al. | |
| 9,274,351 B2 | 3/2016 | Drobe | |
| 9,298,021 B2 | 3/2016 | Krall et al. | |
| 9,395,560 B2 | 7/2016 | Chien | |
| 10,048,511 B2 | 8/2018 | Krall et al. | |
| 10,048,512 B2 | 8/2018 | Krall et al. | |
| 2002/0051116 A1 | 5/2002 | Van Saarloos et al. | |
| 2002/0099305 A1 | 7/2002 | Fukushima et al. | |
| 2003/0016331 A1 | 1/2003 | Mandell | |
| 2006/0092375 A1 | 5/2006 | Menezes et al. | |
| 2006/0139571 A1 | 6/2006 | Poulain et al. | |
| 2006/0170863 A1 | 8/2006 | Krall | |
| 2006/0244915 A1 | 11/2006 | Clemons et al. | |
| 2007/0146628 A1 * | 6/2007 | Green | B29D 11/0048 351/159.02 |
| 2007/0182923 A1 | 8/2007 | Kitani et al. | |
| 2008/0049152 A1 | 2/2008 | Hong et al. | |
| 2008/0117289 A1 | 5/2008 | Schowengerdt et al. | |
| 2008/0278676 A1 | 11/2008 | Croft et al. | |
| 2008/0297721 A1 * | 12/2008 | Gupta | G02C 7/042 351/159.17 |
| 2009/0153796 A1 | 6/2009 | Rabner | |
| 2009/0185137 A1 | 7/2009 | Krall | |
| 2009/0290121 A1 | 11/2009 | Drobe et al. | |
| 2009/0303433 A1 | 12/2009 | Shimojo | |
| 2010/0066974 A1 | 3/2010 | Croft et al. | |
| 2010/0109176 A1 | 5/2010 | Davison | |
| 2010/0271590 A1 | 10/2010 | Kitani et al. | |
| 2011/0051081 A1 * | 3/2011 | Del Nobile | G02C 7/063 351/159.42 |
| 2011/0090455 A1 | 4/2011 | Gupta et al. | |
| 2011/0317127 A1 | 12/2011 | Suzuki et al. | |
| 2012/0002163 A1 | 1/2012 | Neal | |
| 2012/0019774 A1 | 1/2012 | Krall et al. | |
| 2012/0019775 A1 | 1/2012 | Tyrin et al. | |
| 2012/0019776 A1 | 1/2012 | Giraudet | |
| 2012/0081661 A1 | 4/2012 | Yamakaji | |
| 2012/0200822 A1 | 8/2012 | Kaga et al. | |
| 2012/0250152 A1 | 10/2012 | Larson et al. | |
| 2012/0307203 A1 | 12/2012 | Vendel et al. | |
| 2013/0010097 A1 | 1/2013 | Durnell et al. | |
| 2013/0265540 A1 | 10/2013 | Esser et al. | |
| 2013/0293531 A1 | 11/2013 | Cao et al. | |
| 2013/0308099 A1 | 11/2013 | Stack | |
| 2014/0327875 A1 | 11/2014 | Blum et al. | |
| 2014/0375949 A1 | 12/2014 | Buehren | |
| 2015/0049301 A1 | 2/2015 | Krall et al. | |
| 2015/0212338 A1 | 7/2015 | Qi | |
| 2015/0226983 A1 | 8/2015 | Carmon et al. | |
| 2015/0346515 A1 | 12/2015 | Kozu | |
| 2016/0073870 A1 | 3/2016 | Bailey | |
| 2017/0148215 A1 | 5/2017 | Aksoy et al. | |
| 2017/0343835 A1 | 11/2017 | Carmon et al. | |
| 2018/0024380 A1 * | 1/2018 | Vu | G02C 7/042 351/159.06 |
| 2018/0136486 A1 | 5/2018 | Macnamara | |
| 2019/0317337 A1 * | 10/2019 | Sawada | G02C 7/044 |

FOREIGN PATENT DOCUMENTS

| | | |
|---|---|---|
| EP | 2301422 A1 | 3/2011 |
| FR | 2 814 819 A1 | 4/2002 |
| FR | 2 850 763 A1 | 8/2004 |
| GB | 2033101 A | 5/1980 |
| GB | 2364136 A | 1/2002 |
| GB | 2489501 A | 10/2012 |
| JP | 10-322724 | 4/1998 |
| JP | 2002-515132 A | 5/2002 |
| JP | 2002253509 A | 9/2002 |
| JP | 2003-71874 A | 3/2003 |
| JP | 2010-529491 A | 8/2010 |
| JP | 2011072431 A | 4/2011 |
| JP | 2012100759 | 5/2012 |
| JP | 3194002 U | 10/2014 |
| WO | 96/08745 A1 | 3/1996 |
| WO | 97/26580 A1 | 7/1997 |
| WO | 2006/129707 A1 | 12/2006 |
| WO | 2007068819 A1 | 6/2007 |
| WO | 2008012649 A2 | 1/2008 |
| WO | 2008/148084 A1 | 4/2008 |
| WO | 2011067361 A1 | 6/2011 |
| WO | 2012160741 A1 | 11/2012 |
| WO | 2016007124 A1 | 1/2016 |
| WO | 2016020229 A1 | 2/2016 |
| WO | 2016101204 A1 | 6/2016 |
| WO | 2017131770 A1 | 8/2017 |

OTHER PUBLICATIONS

Fogt et al., "Comparison of Fixation Disparities Obtained by Objective and Subjective Methods," Vision Res., 1998, vol. 38, No. 3, pp. 411-421.

Kim, et al., "The Analysis of AC/A Ratio in Nomefractive Accommodative Esotropia Treated with Bifocal Glasses", Korean Journal Ophthalmology, Published 2012, vol. 26, No. 1, pp. 39-44, col. 2, para 2; pISSN: 1011-8942.

Remole et al, "Objective Measurement of Binocular Fixation Misalignment," American Journal of Optometry & Physiological Optics, 1986, vol. 63, No. 8, pp. 631-638.

Shapiro, I. Jonathan, "Parallel-Testing Infinity Balance. Instrument and Technique for the Parallel Testing of Binocular Vision." Optometry and Vision Science, 1995, vol. 72, No. 12, pp. 916-923.

Teitelbaum et al., "Effectiveness of Base in Prism for Presbyopes with Convergence Insufficiency", Optometry and Vision Science, Feb. 2009, vol. 86, No. 2, pp. 153-156.

Wisnicki, H. Jay, M.D., "Bifocals, Trifocals, and Progressive—Addition Lenses," American Academy of Ophthalmology, vol. XVII, No. 6, Jun. 1999, pp. 1-8.

* cited by examiner

| Prism / Optical power | Zero Prism | Single zone | Concentric two-zone, sharp | Concentric two-zone, progressive | Top-bottom two-zone, sharp | Top-bottom two-zone, progressive | Multi-zone |
|---|---|---|---|---|---|---|---|
| Zero power | | single zone | concentric, two-zone, sharp | concentric, two-zone, progressive | top-bottom two-zone, sharp | top-bottom two-zone, progressive | multi-zone |
| Single zone | | zero | zero | zero | zero | zero | zero |
| Concentric two-zone, sharp | Existing contact lens designs | single zone | concentric, two-zone, sharp | concentric, two-zone, progressive | top-bottom two-zone, sharp | top-bottom two-zone, progressive | multi-zone |
| Concentric two-zone, progressive | | single zone | single zone | single zone | single zone | single zone | single zone |
| Top-bottom two-zone, sharp | | single zone | concentric, two-zone, sharp | concentric, two-zone, progressive | top-bottom two-zone, sharp | top-bottom two-zone, progressive | multi-zone |
| Top-bottom two-zone, progressive | | concentric, two-zone, sharp | concentric, two-zone, sharp | concentric, two-zone, progressive | concentric, two-zone, sharp | concentric, two-zone, sharp | concentric, two-zone, sharp |
| Multi-zone | | single zone | concentric, two-zone, sharp | concentric, two-zone, progressive | top-bottom two-zone, sharp | top-bottom two-zone, progressive | multi-zone |
| | | concentric, two-zone, progressive | concentric, two-zone, progressive | concentric, two-zone, progressive | concentric, two-zone, progressive | concentric, two-zone, progressive | concentric, two-zone, progressive |
| | | single zone | concentric, two-zone, sharp | concentric, two-zone, progressive | top-bottom two-zone, sharp | top-bottom two-zone, sharp | top-bottom two-zone, sharp |
| | | top-bottom two-zone, sharp | top-bottom two-zone, sharp | top-bottom two-zone, sharp | top-bottom two-zone, sharp | top-bottom two-zone, progressive | top-bottom two-zone, progressive |
| | | top-bottom two-zone, progressive | top-bottom two-zone, progressive | top-bottom two-zone, progressive | top-bottom two-zone, progressive | top-bottom two-zone, progressive | top-bottom two-zone, progressive |
| | | single zone | concentric, two-zone, sharp | concentric, two-zone, progressive | top-bottom two-zone, sharp | top-bottom two-zone, progressive | multi-zone |
| | | multi-zone | multi-zone | multi-zone | multi-zone | multi-zone | multi-zone |

FIG. 13 method 200

```
providing (202) an injection mold, with the negative
shape of a prismatic contact lens 100 with a first prism
zone 110, having a first prism and a first optical
power; and a progressive prism zone 130, adjacent to
the first prism zone 110, having a progressive prism
that varies from the first prism to a second prism
```

↓ heating (204) a soft contact lens material
to a molten contact lens material

↓ injecting (206) the molten contact lens material into the
injection mold to create a molded prismatic contact lens

↓ cooling (208) the molded prismatic contact
lens 100 by cooling the injection mold

↓ removing (210) the cooled, molded prismatic
contact lens 100 from the injection mold

FIG. 15A

PRISMATIC CONTACT LENS

CROSS-REFERENCE

This is a continuation application of U.S. patent application Ser. No. 15/399,746: "Prismatic contact lens", filed on Jan. 6, 2017, the entire content of which is hereby incorporated in its entirety.

FIELD OF INVENTION

This invention relates generally to contact lenses, in more detail to prismatic contact lenses that reduce eye-strain, convergence insufficiency, and proprioceptive overstimulation.

BACKGROUND

Every waking moment our eyes transmit images to our brain. The brain also receives feedback regarding the current orientation of our eyes. Our brain then takes the images from each eye, as well as the orientation information, and synthesizes a three-dimensional picture that we use for visually orienting throughout our daily lives. This synthesis is performed quickly and subconsciously at a core level of our brain.

When we need to move our eyes from a present target to a new one, such as to the next word during reading, or to the next road sign during driving, our brain calculates the amount our eyes need to rotate in order to view the new target. In asymptomatic patients, the peripheral vision correctly calculates how our eyes need to move to align our central vision, centered on the fovea, to the new target. In symptomatic patients, our peripheral vision miscalculates the amount of movement, or rotation, that is required to align our central vision with the new target. This miscalculation of the direction of the new target is caused by the peripheral vision not being seamlessly integrated, or coordinated, with the central, foveal vision. This inconsistency between peripheral and central vision typically leads to incorrect initial movements by our extraocular muscles that are responsible for rotating the eyes, and force the brain to take additional steps to realign central binocularity onto the fovea. The mechanism responsible for the coordination of the central vision, the peripheral vision, and the eye movements in our proprioceptive system.

The lack of efficient coordination between these systems, if it persists over time, can lead to excess signaling, or rogue signals, coordinated via the ophthalmic division of our trigeminal nerve. The resulting symptomology is from our proprioceptive system, and results in a type of eye-strain, or asthenopia.

Another source of asthenopia is convergence insufficiency. With normal vision, an individual is able to focus at objects located at different distances. Ideally, an individual is able to focus on distant objects, referred to as distance-vision, and on near objects, referred to as near-vision. The optical system of the eye uses numerous muscles to focus for both distance-vision and for near-vision. These muscles adjust various aspects of the eye when transitioning between distance-vision and near-vision. The muscle adjustments include making subtle changes to the shape of the crystalline lens to adjust the focus of the lens, rotating the eyeballs to rotate their optical axes, and changing the size of the pupils.

Presbyopia is a natural deterioration of near vision caused by loss of flexibility in the eye's crystalline lenses as one ages. Presbyopia can be partially compensated by wearing "reading" glasses for reading that correct near-vision refraction errors so that the eye does not have to strain as much to focus as strongly when gazing at near objects. Presbyopic persons need different optical corrections for near-vision and for distance-vision. However, using two glasses, and changing them with great frequency is distracting. To avoid continually exchanging eyeglasses, a combination of glasses and contact lenses are used by some patients. Others use bifocal glasses that offer different optical corrections for near-vision and for distance-vision. The transition between these two vision regions can be abrupt, or it can be gradual. The latter eyeglasses are called Progressive Addition Lenses (PALs). Abrupt change bifocals have a visible line separating the two vision regions, while PALs have no lines or edges visible between the regions with different dioptric powers. Recently, contact lenses also appeared in bifocal and other advanced forms.

In spite of all this progress with glasses and contact lenses, vision-related discomforts still persist. One of these discomforts is related to a shift of habits in the modern, digital lifestyle. A large and increasing fraction of professions require workers to spend a large and increasing fraction of their working time focusing at close-distance digital interfaces, including computer screens and mobile devices. The same is true for the private lives of many, spending hours playing video games, texting and checking updates on cell phones. All these professional and behavioral shifts rapidly increased the time people spend looking at digital screens, devices, displays, and monitors at a much closer distance than before. The increased time of the eye being trained at near-vision targets places excessive demands on the extraocular muscles involved in near-vision, often straining them beyond the comfort zone. This can lead to fatigue, discomfort, pain, and eventually to digitally induced migraines. And when the eyes' ability to remain trained for long times at near objects decreases because of muscle fatigue, or increasingly incorrect peripheral vision, a convergence insufficiency can develop, that leads to other forms of asthenopia. Up to now, there is no widely accepted consensus on the precise causation mechanism of these digital-device related visual discomforts, pains and migraines. Therefore, there is a need for new and inventive glasses and contact lenses that can provide relief for digital eye discomforts.

SUMMARY

In some embodiments, a prismatic contact lens comprises a first prism zone, having a first prism and a first optical power; and a progressive prism zone, adjacent to the first prism zone, having a progressive prism that varies from the first prism to a second prism. The prismatic contact lens can further comprise a second prism zone, adjacent to the progressive prism zone, having the second prism and a second optical power.

In some embodiments, a prismatic contact lens comprises a first prism zone, having a first prism and a first optical power; a second prism zone, adjacent to the first prism zone, having a second prism and a second optical power; and a sharp transition between the first prism zone and the second prism zone.

BRIEF DESCRIPTION OF THE DRAWINGS

FIG. 13 illustrates a table that describes a large number of combinations of embodiments with various prisms and optical powers.

FIGS. 15A-B illustrate two methods of making the prismatic contact lens 100.

DETAILED DESCRIPTION

Figure 1B:
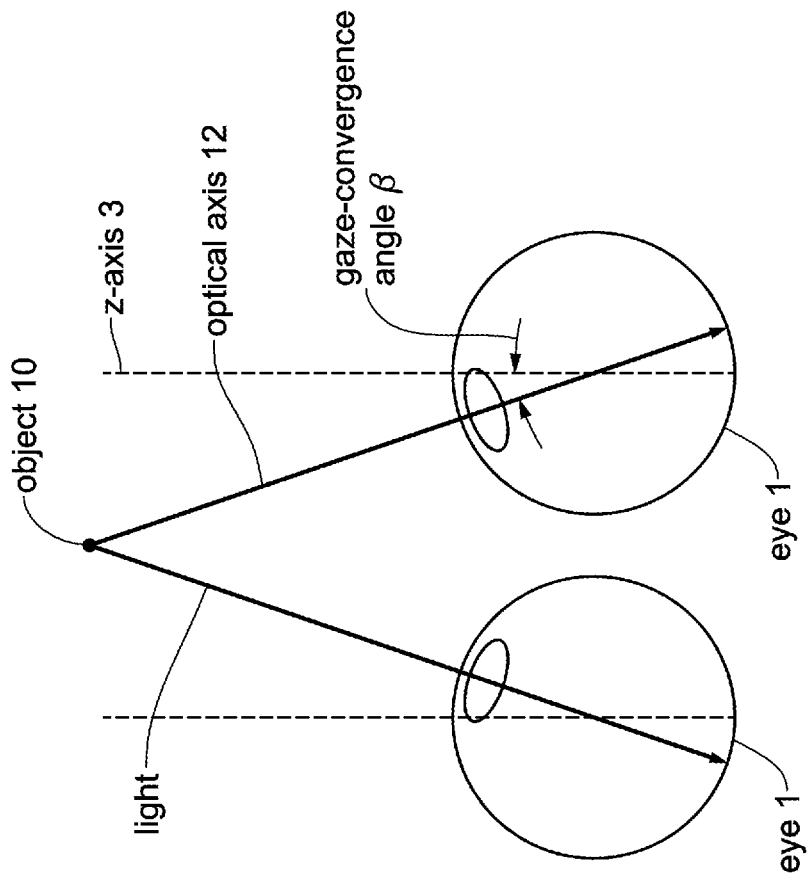
FIGS. 1A-B illustrate the gaze convergence of the eyes for nearby objects.

Embodiments of the invention are capable of reducing various sources of eye-strain, or asthenopia, such as fixation disparity and convergence insufficiency. It has been suggested that an underlying common driver of these eye conditions is proprioceptive feedback, or proprioceptive overstimulation. Convergence insufficiency emerges when the gaze of the two eyes converges on a nearby object during binocular fixation, but the optical axes do not converge properly. Looking at nearby objects, such as computer screens, over a long time, especially through positive power lenses can strain the extraocular muscles excessively and thus can cause such a convergence insufficiency. Recently, it has been proposed that convergence insufficiency can be reduced by introducing a prism in the optical pathway.

Fixation disparity, and the underlying proprioceptive overstimulation impacts the vision when the viewer decides to look at a new target that is peripheral relative to the optimal, foveal region, or when the eye and the target move relative to each other, and the tracking of the same target requires following its image to a peripheral visual region. It is quite remarkable that even as little as a 2 degrees deviation from the optimal foveal spot on the retina leads to a decrease of the retinal resolution by about 50%. For example, when one reads a word in a text, the 2 degrees difference translates to only one or two words ahead in the text. These numbers underline the importance of properly locating the new target, so that the head and the rotation of the eye optical axes to acquire the new target, such as the next word, can be performed with high precision and often. The person's brain acquires the new target in the peripheral vision region, and initiates adjustments of the neck, the head, the rotational state of the eye and the optical system of the eye to move the image of the new target to the central, foveal region. When the eye controlling systems and the peripheral vision do not work seamlessly together, these adjustments will not track the existing targets, or will not acquire the new targets correctly, resulting in fixation disparity, proprioceptive feedback, or proprioceptive overstimulation, and eye-strain. The amount of prism that corrects fixation disparity is sometimes called associated phoria. Notably, inserting a prism into the optical pathways can correct this misalignment, just like the above described convergence insufficiency.

As a background, it is recalled that there are four principal systems that control and operate the eye movements. These four systems have their own neurological pathways.

Although they are distinct from each other, there is significant overlap between them. These systems are the following.

(1) The fast eye movement systems, also known as saccades. These are actuated by the neural discharges of burst, or pulse, generators. These are relatively localized clusters of neuron cell bodies in the brainstem. These burst generators activate the motor neurons to make the ophthalmic muscles contract to rotate the eyes toward the new target. They also suppress the muscle inhibitors to make this process more efficient. The result of the initial, saccadic adjustment is a series of rapid, fitful, twitchy eye movements with only limited precision that bring the image of the new target close to the fovea region, where the visual receptor density is the highest.

(2) The smooth pursuit system often takes over from the saccadic system once the image of the new target reached the fovea region. This smooth pursuit system generates a smoother muscle function to center the acquired target, thereby keeping the target image steadily centered on the fovea.

(3) If the target moves too fast and leaves the fovea region, the saccades are reactivated to re-center the image. Intriguingly, if the image moves too fast because of the head movement of the viewer, a different system, the vestibular-ocular reflexes, or VOR system, is called upon to compensate the head movement and stabilize the target image.

(4) Finally, vergence movements also play an important role in the image acquisition and tracking process. These vergence movements adjust the direction of the optical axes of the two eyes relative to each other to converge on the target. The convergence of the optical axes needs to be updated and readjusted as the target, the head, or both are moving, in order to acquisition and to maintain a sharp image as the distance of the target changes relative to the viewer.

Also, even for stationary targets that are close to the viewer, such as computer monitors, when using positive optical power lenses for vision correction, the optical axes of the eye need to be turned toward each other even harder by the vergence movements, because the relative angle of the two surfaces of the positive power lens induces a light-refracting prism effect. This can cause or exacerbate convergence insufficiency, as it strains the extraocular muscles excessively.

In sum, these four vision control systems have to function seamlessly and in a coordinated manner with the peripheral and central vision of our eyes, and with our feedback systems. When they do not function well together, and are not in good synchrony with each other, the relative motion of the target and the viewer, the mechanism of acquiring new targets, and the convergence insufficiency creates eye-strain and asthenopia, causing substantial discomfort, as described next.

The eye-strain symptoms can include headaches. When the saccadic movements drive adjustments that move the image of a peripheral target to the central fovea by quick bursts to conjugate eye muscles, but the adjustments do not yield good foveal alignment, conflicting binocular signals from the eye control systems sometimes over-stimulate the trigeminal nerve, or send rouge proprioceptive signals through it. Either of these can cause substantial headaches, possibly evolving into migraines.

Another asthenopia symptom is neck pain. Once the peripheral retinal perception of the new target has been signaled to the cortical and subcortical visual areas, this signal is translated into an ocular motor system and is used to initiate the saccadic eye movement and corresponding head and neck movements. The eye and the head are moved by amounts deduced from the peripheral retinal signals. If the peripheral visual information was incorrect, or the communication and translation between peripheral visual perception and the eye-control systems is not synchronized well, the resulting tracking and vergence movements will yield fixation disparity, stimulating the proprioceptive feedback mechanism.

Visual disparity can lead to muscle pain because the extraocular muscles and neck muscle afferents show considerable convergence with the retinal afferents within the superior colliculus. A relevant study in cats found that nearly 50% of the cells that originate with the colliculospinal tract receive convergent input from extraocular muscle, neck muscle afferents, as well as from the retina.

The above sections summarized the pathophysiology of various forms of asthenopia. These sections also suggest that improving the synchronity, cooperation, and overlap between the peripheral vision and the central vision by optical systems that refract the light between them can alleviate several of the drivers of asthenopia.

A natural optical system that refracts the light can be a convergence-reducing lens and a prismatic eyeglass. Convergence-reducing glasses have been described in the commonly owned U.S. patent application Ser. No. 15/289,157, "Eye-strain reducing lens", by J. Krall, A. Plumley and G. Zimanyi, hereby incorporated in its entirety by reference. In the embodiments below, these convergence-reducing ideas are adapted and transformed, with additional substantial insights and key modifications, to the other large class of vision correction system, contact lenses.

To establish a context and platform for these later-described prismatic contact lenses, we first summarize key features of the convergence-reducing and prismatic eyeglasses.

Figure 1A:
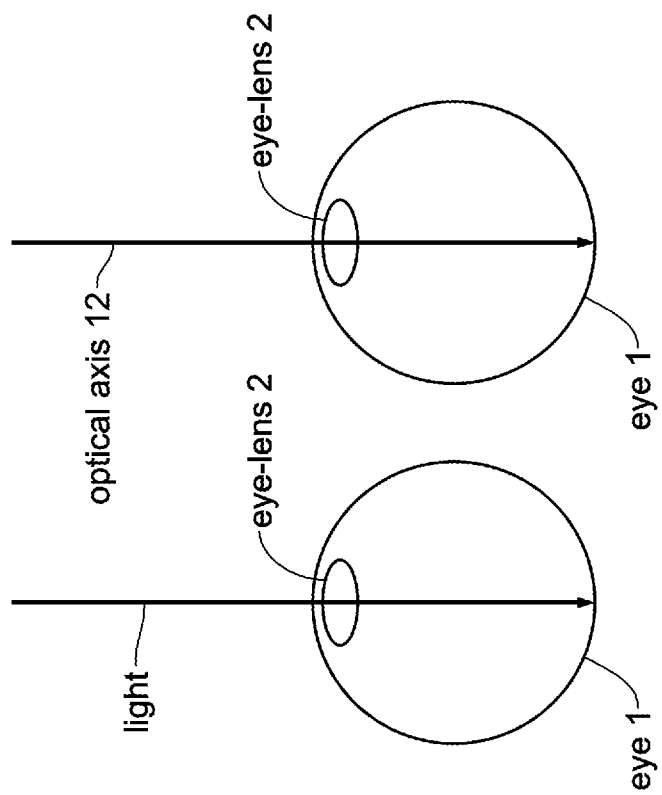

FIGS. 1A-B illustrate how the refraction angle, induced by a positive power lens, increases the convergence of the gaze of glass-wearers.

FIG. 1A illustrates that when a person is gazing at a remote object, then the gazing-directions of the left and right eyes are essentially parallel, and thus there is no convergence of the gazing-directions. Therefore, the extra-ocular muscles are not strained at all. In such cases, the two z-axes 3, pointing to the remote object through the center of the eye 1, coincide with the two eye-optical axes 12. The light from the remote object is entering the eye 1 through the eye-lens 2 on its way to hitting the retina. These parallel z-axes 3 will be used next as references to characterize the gaze-convergence angles of gazes directed at near objects.

FIG. 1B illustrates that when a person is gazing at a near object 10, the gazes of the left and right eyes are tilted, or rotated, towards each other, each gaze making a non-zero gaze-convergence angle $\beta$ with the z-axes 3. Since the gaze-convergence angle $\beta$ characterizes the convergence of the gazes of the two eyes towards each other, in what follows the gaze-convergence angle $\beta$ will refer specifically to the x-component of the overall gaze-rotation angle of the eye. This makes the gaze-convergence angle $\beta$ analogous to an x-component to a refraction angle $\alpha^x$ of a lens.

As mentioned before, the eyeballs are rotated by extraocular muscles attached externally to the eye. In particular, the lateral, x-directional, rotations are controlled by the medial rectus and the lateral rectus muscles, and the vertical rotations are controlled by the superior rectus and the inferior rectus, and inferior oblique muscles. When the medial rectus muscles of the left-eye and the right-eye contract, the gazes of these eyes converge towards each other. A person, training his/her eye on a near object, such as an electronic screen, a digital screen, a screen of a mobile electronic device, work-related papers, or even a book, for extended periods requires the continuous contraction of the medial rectus muscles, thus exerting substantial strain on them. This "digital eye-strain" can lead to fatigue, leading to headache, eventually culminating in migraines, caused by the demands of the modern, digital lifestyle.

The digital lifestyle can induce other forms of asthenopia, or eye-strain, and other types of convergence-disorders, including proprioceptive overstimulation and/or fixation disparity. Proprioceptive overstimulation, and fixation disparity are related to the imbalance between where the eyes are consciously focused and the nonvisual perception of where the object is located in space. This disparity often varies with space. The brain of a patient with excited proprioceptive overstimulation and/or fixation disparity, can compensate this disparity to a degree in order to maintain a clear image of the target. However, when the disparity becomes too big to be compensated, the trigeminal nerve can get overstimulated, resulting in patients experiencing headaches, eye fatigue, pain around the eyes, blurred vision, neck pain, dry eyes, and other general symptoms of asthenopia.

A class of symptoms especially worthy of mentioning is Computer Vision Syndrome (CVS), which is estimated to affect more than 100 million Americans. Computer Vision Syndrome is the physical eye discomfort felt after gazing for a prolonged amount of time at a nearby digital device, causing an array of asthenopia symptoms, and negatively effecting productivity.

Another large class of symptoms is known by the name of Chronic Daily Headaches (CDH). CDH symptoms are estimated to affect more than 30 million Americans. These patients suffer from an over-stimulation of the trigeminal nerve that manifests itself in the form of chronic daily headaches. Various factors and triggers are believed to contribute to the debilitating issue of chronic daily headache. As a result, patients suffering from CDH are limited to treatment options that merely seek to dull the symptoms. A large subset of chronic daily headache patients (believed to be as large as 30% of the population) shows objective signs of a misalignment between how the central visual system, peripheral visual system and neurological system interact.

Figure 2A:
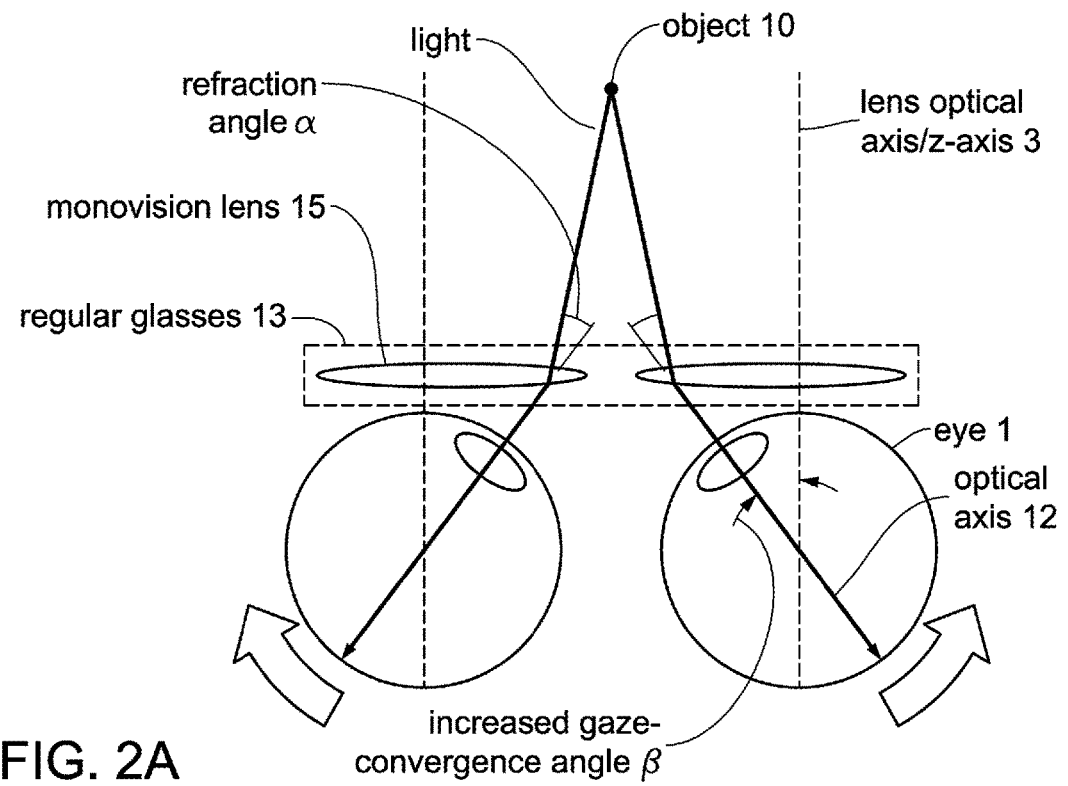
FIGS. 2A-B illustrate the reduction of gaze convergence by convergence reducing glasses.

FIG. 2A illustrates that positive power spectacles 30 can exacerbate the symptoms of eye-strain, asthenopia, Computer Vision Syndrome, fixation disparity, and proprioceptive overstimulation caused by digital devices, because looking at digital devices, or objects 10 that are nearby, forces the wearer to gaze through the lower-inferior nasal quadrant, the "near-vision" region, of their glasses. In this off-center near-vision region positive power monovision lenses 15 of the regular glasses 13 refract the light by a refraction angle $\alpha$. A ray that propagates from the near object 10 to the retina with the refraction angle $\alpha$ forces the wearer to rotate her eye to a greater gaze-convergence angle $\beta$ than a ray's direction that propagates from the same object to the same retina but without the refraction a by the lens 15. Therefore, positive power lenses 15 of regular glasses 13 force an increased gaze-convergence angle β and thus cause an increased strain on the medial rectus muscles when the wearer is looking at near objects. The sustained and excessive contraction of the medial rectus muscles increases the tendencies for a digital migraine that affect and possibly debilitate the wearer.

Figure 2B:
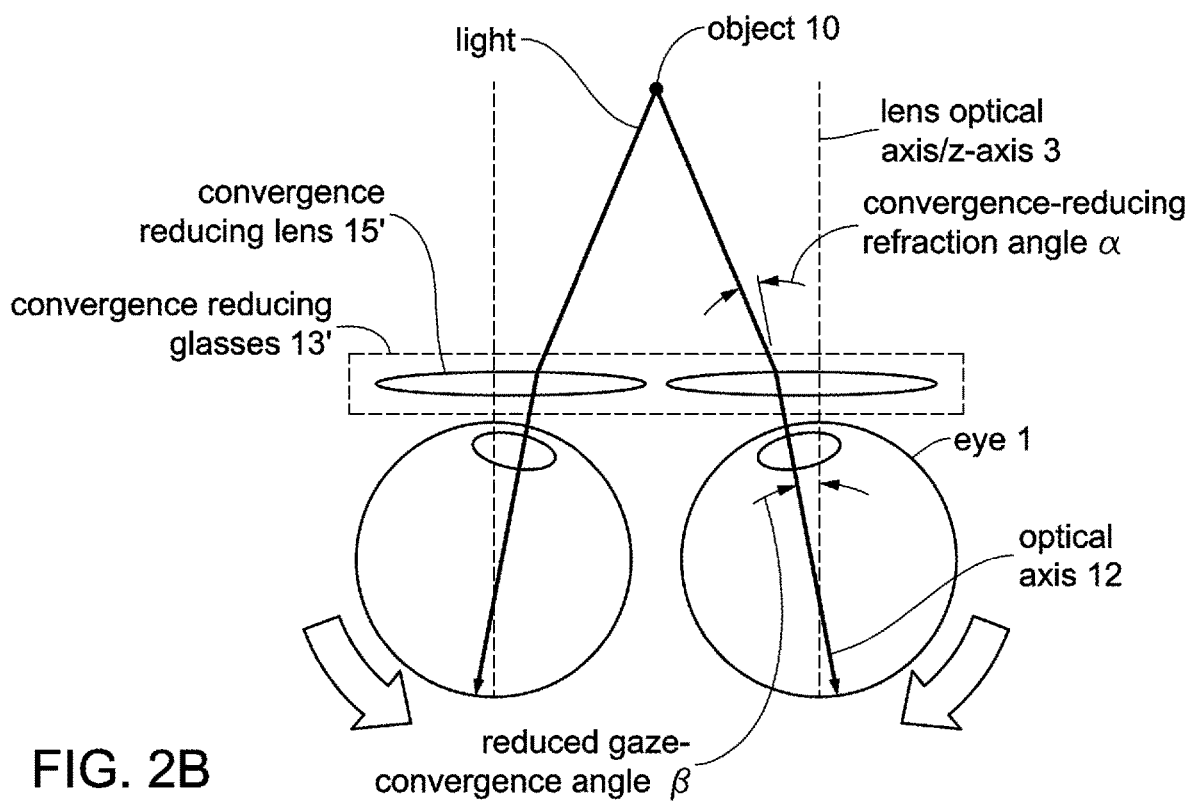

FIG. 2B illustrates embodiments of a convergence-reducing lens 15' in a convergence-reducing spectacle 13' that can reduce, and often eliminate the symptoms of eye-strain, asthenopia, Computer Vision Syndrome, fixation disparity and proprioceptive overstimulation. The convergence-reducing, or prismatic spectacles 13' with convergence-reducing lenses 15' have a refraction-angle α that is modified by a base-in prism that reduces the gaze-convergence angle β when their wearers look at a nearby object 10, such as at a digital device. This reduction is shown by the nasally pointing, solid curved arrows. Reduced gaze-convergence angles β require a lesser rotation of the eyes in the nasal direction, and therefore relieves the continuous contraction and strain of the medial rectus muscles of the eyes. This reduced muscle strain reduces and often eliminates the symptoms of asthenopia.

There are several ways to characterize and describe embodiments of convergence reducing and prismatic lenses. Some of these are described in the above-incorporated U.S. patent application Ser. No. 15/289,157. Some embodiments include an eye-strain-reducing lens, wherein a central normal of the eye-strain-reducing lens defines a z-axis, and a central region of the eye-strain-reducing lens defines a tangential, centered x-y plane, together defining an x-y-z coordinate system of the eye-strain-reducing lens, the eye-strain-reducing lens comprising a distance-vision region, having a distance-vision optical power, configured to refract a light ray directed by a source at a distance-vision region point at a distance-vision x-distance from a center of the coordinate system, to propagate to an eye-center-representative location; and a near-vision region, having a near-vision optical power, configured to refract a light ray, directed by the source at a near-vision region point at a near-vision x-distance from the center of the coordinate system, to propagate to the same eye-center representative location; wherein the near-vision x-distance is smaller than the distance-vision x-distance.

Some other embodiments include a prismatic lens of a low-convergence spectacle, wherein a central normal of the convergence-reducing lens defines a z-axis, and a center of the convergence-reducing lens defines a tangential, centered x-y plane, together defining an x-y-z coordinate system of the convergence-reducing lens, the convergence-reducing lens comprising a distance-vision region, having a distance-vision optical power, configured to refract a light ray, directed parallel to the z-axis at a distance-vision region point at an x-distance from a y-z plane of the coordinate system, to intersect the y-z-plane at a distance-vision intersection z-distance; and a near-vision region, having a near-vision optical power, configured to refract a light ray, directed parallel to the z-axis at a near-vision region point at the x-distance of the distance-vision region point, to intersect the y-z-plane at a near-vision intersection z-distance that is greater than the distance-vision intersection z-distance.

The above highlighted ways to characterize the introduction of, and to verify the presence of a prism in optical lenses and spectacles, are described further in substantial detail in the commonly owned U.S. patent application Ser. No. 15/289,157, incorporated in its entirety by reference.

Figure 3A:
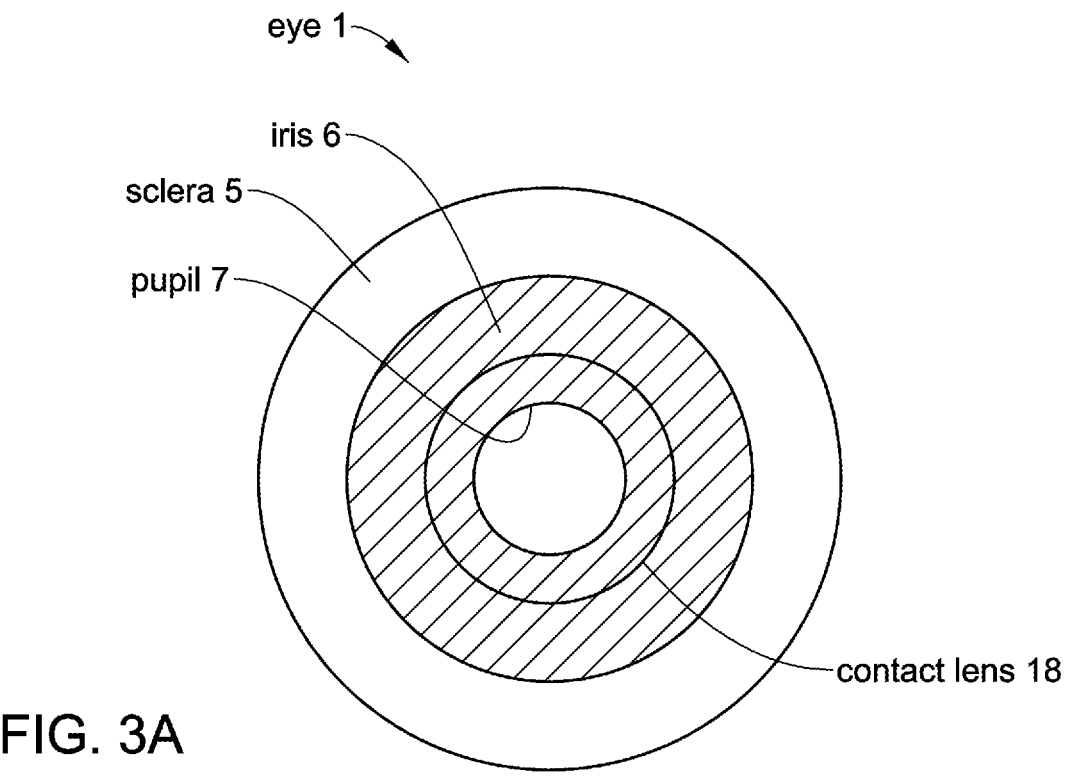
FIGS. 3A-B illustrate an existing non-prismatic contact lens.
Figure 3B:
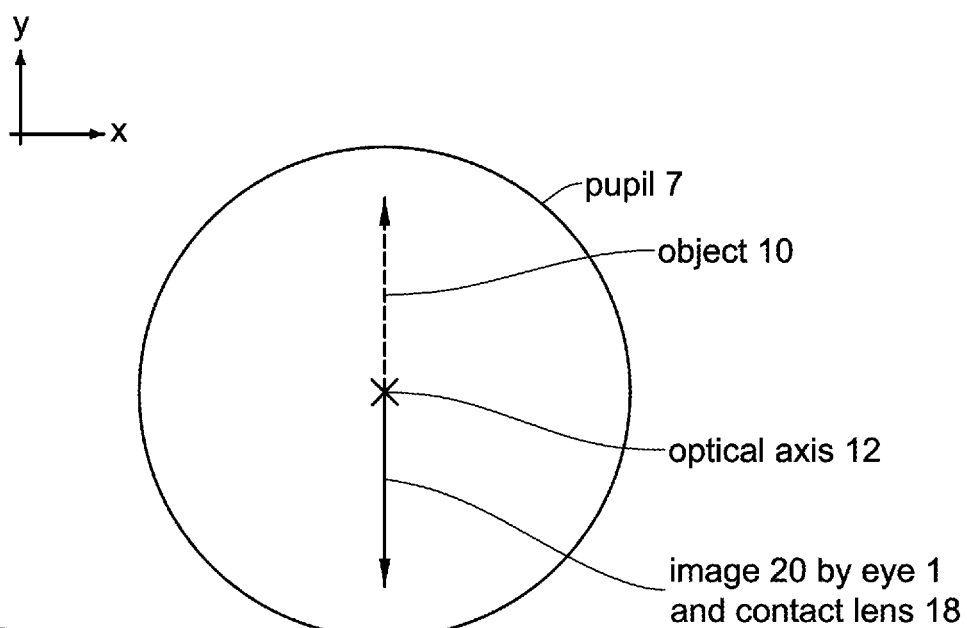
Figure 4A:
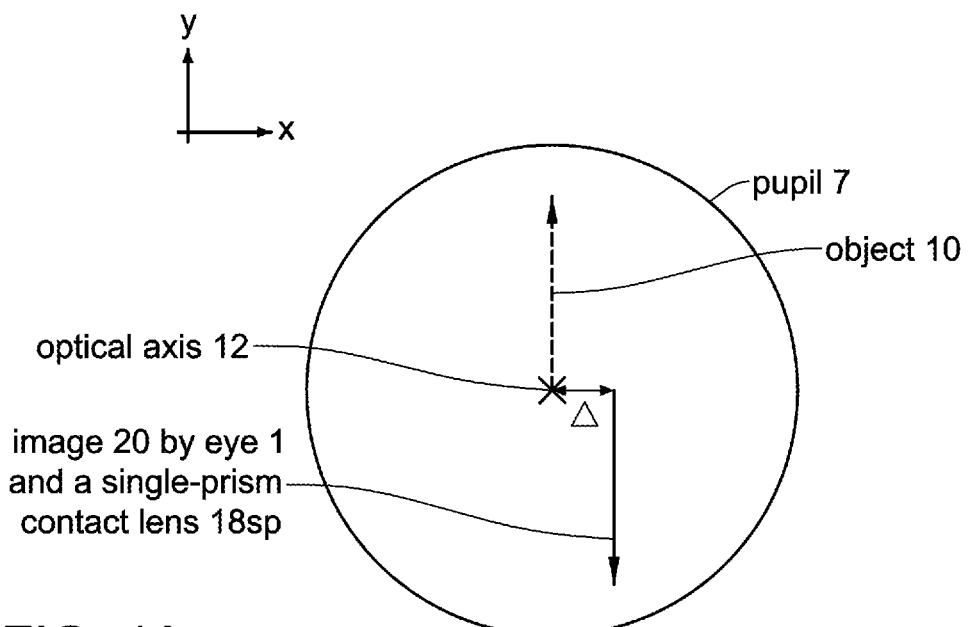
FIGS. 4A-B illustrates an embodiment of a single-prism contact lens.
Figure 4B:
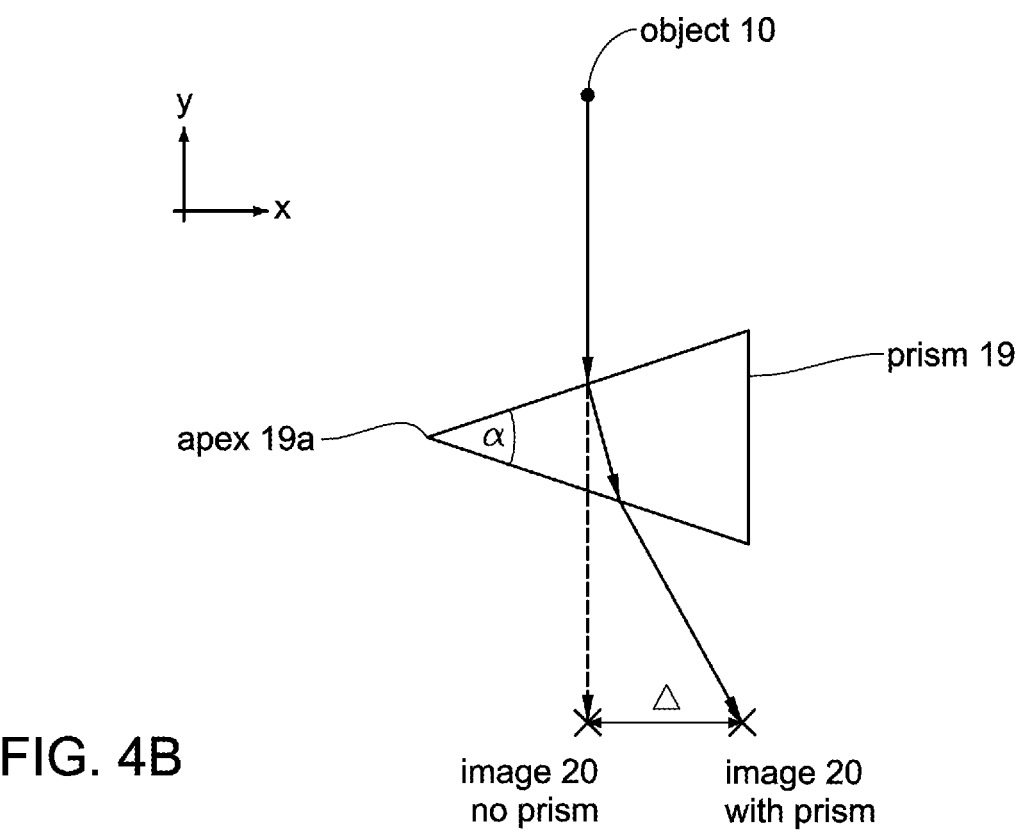
Figure 5A:
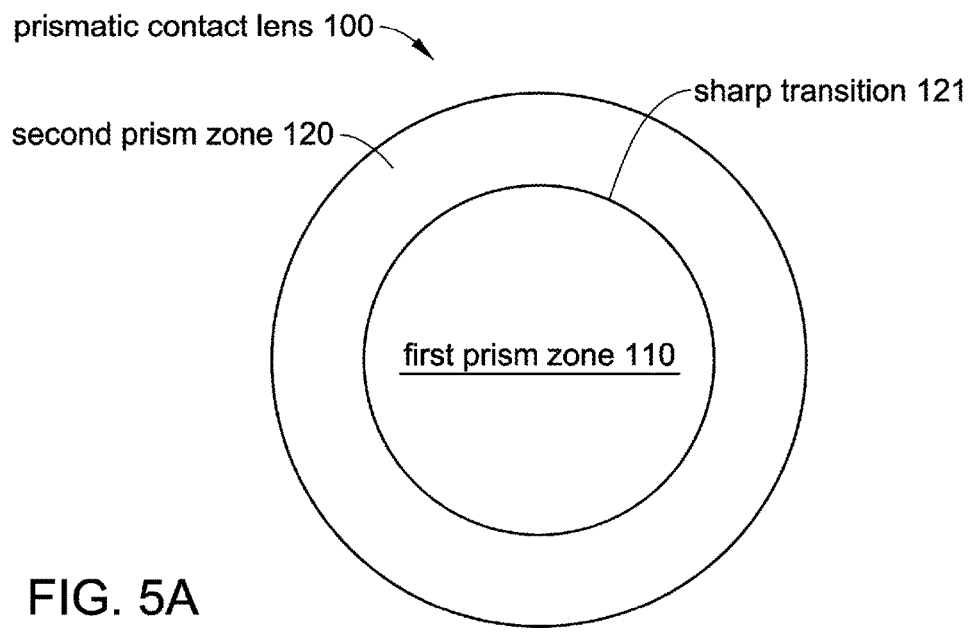
FIGS. 5A-B illustrate a two-prism contact lens.
Figure 5B:
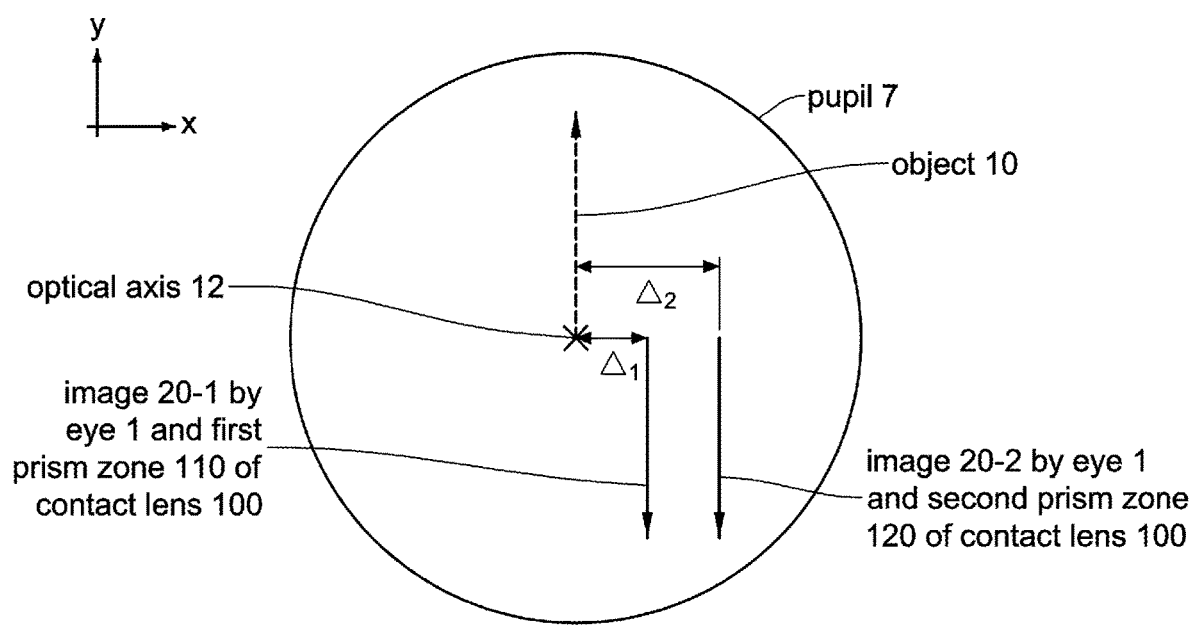

The utility and efficacy of convergence-reducing lenses and spectacles can serve as a starting point from where additional insights and key modifications can assist the adaptation of prismatic effects to the other large class of vision correction devices: contact lenses. This idea and insight is developed and described in the embodiments below. FIGS. 3A-B set the baseline of regular, non-prismatic contact lenses, FIGS. 4A-B illustrate a single prism contact lens. FIGS. 5A-B illustrate a two-prism contact lens, and a challenging aspect of its optical performance. Motivated by the challenge of FIGS. 4 and 5, FIGS. 6A-B illustrate a progressive prismatic contact lens with an improved optical performance.

FIG. 3A illustrates a regular, non-prismatic contact lens 18, positioned on a proximal, corneal surface of an eye 1. A sclera 5, an iris 6 and a pupil 7 of the eye 1 are also indicated.

FIG. 3B illustrates the imaging by the non-prismatic contact lens 18, looking straight along the optical axis 12 of the eye-lens system. Here only the pupil 7 is shown, the rest of the peripheral elements of the eye 1 are omitted for clarity. When the non-prismatic contact lens 18 images a centrally positioned line-like object 10, directed upward from the optical axis 12, the image 20 on the retina will be a line, directed downward from the optical axis 12. The upward and the downward pointing lines are aligned with each other. The line-like object 10 can be an actual thin rod or wire, or it can be a laser beam stretched into a sheet of light, generated by sending a laser beam through a cylindrical lens. For reference, an x-y coordinate system is also shown. Using this system as a reference, "upward" translates to the line-like object 10 being directed along the positive y-axis, "downward" translates to the image 20 being directed along the negative y-axis.

FIG. 4A illustrates a single-prism contact lens 18sp imaging the same line-like upward-pointing object 10 into a downward-pointing image 20, just like the non-prismatic contact lens 18. However, the prismatic effect of the single prism contact lens 18sp shifts, or displaces, the image 20 sideways along the x-axis by a shift A. An often-used nomenclature is to call the prism "base-in", if its base, or widest portion, is closest to the nose, and its thin, apical portion is farthest from the nose. This nomenclature is particularly clear and self-evident for simple, triangular prisms.

FIG. 4B illustrates this prismatic effect in some detail. The prismatic effect can be generated by two optical refractive surfaces, such as the proximal and distal surfaces of the single-prism contact lens 18sp, or by the flat surfaces of a triangular glass prism 19, that are tilted relative to each other by a prism, or tilt, angle α. The line along which the tilted surfaces, or their extensions, meet is called an apex 19a of the prism. In the simple case of the triangular glass prism 19, the edge along which the two sides of the triangle meet is the apex 19a. Visibly, if the apex 19a is pointed upward, vertically aligned with the y-axis, then the prismatic shift A is in the x direction. Orienting the prismatic apex 19a along the upward, vertical, or y-direction is a typical utilization of a prismatic lens, let it be a spectacle lens or a contact lens, as this prism orientation shifts the image 20 in the horizontal, or x direction. A horizontal, or x shift of the image 20 is well-suited to alleviate the convergence insufficiency, computer vision syndrome, and other forms of eye-strain, as discussed above.

The degree of prismatic shift is often characterized in term of prismatic diopters. A lens is said to have a prismatic power, or prismatic diopter of 1D, if it deflects a paraxial light beam by the prismatic shift A=1cm on a screen positioned 1 m behind the lens.

To summarize, a prism has a prismatic power and a refraction direction. The prismatic power describes how much the prism refracts an incoming light beam. The refraction direction captures that in which direction the prism refracts the incoming light beam. The prism refraction direction is typically orthogonal to the prism apex 19*a*. It is also noted that in most prismatic lenses the prism angle α is small, and therefore the two refractive surfaces do not meet in the apex 19*a*, only their extensions meet.

FIGS. 5A-B illustrate a challenge that emerges during the design of more complex prismatic lenses. With advancing age, the eye's ability to adapt is diminishing. In the context of diminished accommodation of the optical powers, this phenomenon is called presbyopia. A widely-used prescription for presbyopia is an eye-glass with bifocal lenses that have different optical powers in their upper, distance vision region, and in their lower, near-vision region.

In an analogous manner, in some lenses it can be advantageous to have different prismatic powers in different regions. For example, the lower, near-vision region of a bifocal lens may need a prism implemented to correct convergence insufficiency, or to reduce eye-strain from excessive extraocular muscle strain. At the same time, since the upper, distance-vision region is typically not used to gaze at near objects, it may not need the implementation of a prism.

FIG. 5A illustrates that in some designs, such as in a prismatic contact lens 100, a central first prism zone 110 of the prismatic contact lens 100, through which a patient is looking at a present target, may need little or no prism. At the same time, a peripheral, or annular, second prism zone 120 of the prismatic contact lens 100, through which the peripheral vision is already training on the next target, such as the next word during reading, may need a prism implemented in order to alleviate symptoms of asthenopia. In a more general sense, the first prism zone 110 can have a first prism, and the second prism zone 120 can have a second prism. According to the previous general discussion of prisms, the first prism has a first prismatic power and a first prism refraction direction, and the second prism has a second prismatic power and a second prism refraction direction.

FIG. 5B illustrates, again concentrating on the pupil 7 of the eye 1, that the first prism zone 110 of the prismatic contact lens 100 may shift the image 20-1 in the horizontal, x direction by a $\Delta_1$ amount, while the peripheral second prism zone 120 may shift the image 20-2 by a larger $\Delta_2$ amount in the same x direction, where $\Delta_1$ is proportional to a first prismatic power, or first prism diopter of the first prism zone 110, and $\Delta_2$ is proportional to a second prismatic power, or second prismatic diopter of the second prism zone 120.

Notably, in bifocal lenses, different optical powers are generated by different lens curvatures, which generate a visible, high-scatter sharp line between the distance-vision and the near-vision regions. To avoid generating such an undesirable sharp line, in a new generation of lenses the transition has been made gradual and smooth. By varying the lens curvature gradually, and not in a step-like manner along the y-direction, the optical power in these "progressive" lenses progressively transitions from the distance-vision optical power to the near-vision optical power.

Figure 6A:
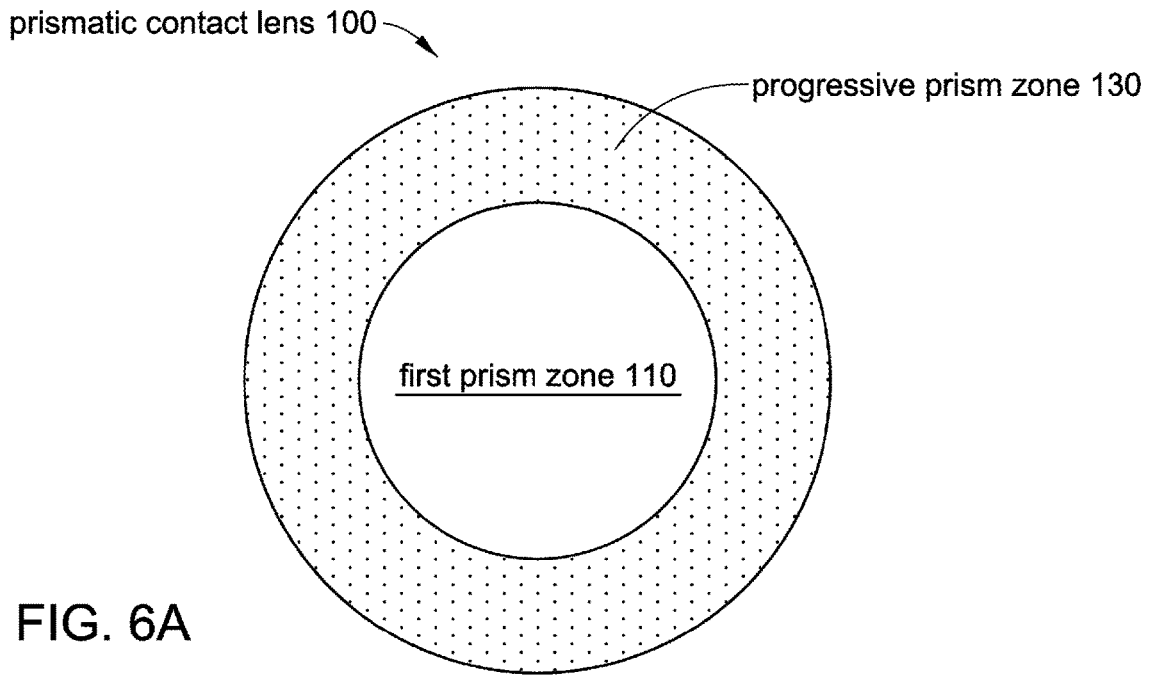
FIGS. 6A-B illustrate a progressive prismatic contact lens.

FIG. 6A illustrates key elements of a solution to avoid generating a visible sharp transition 121 between zones with different prismatic power. Embodiments can include the prismatic contact lens 100 that comprises the first prism zone 110, having a first prism and a first optical power; and a progressive prism zone 130, adjacent to the first prism zone 110, having a progressive prism that varies from the first prism to a second prism. As discussed above, this can mean that a prismatic power of the progressive prism varies from a first prismatic power to a second prismatic power, and a prism refraction direction of the progressive prism varies from a first prism refraction direction to a second prism refraction direction.

Figure 6B:
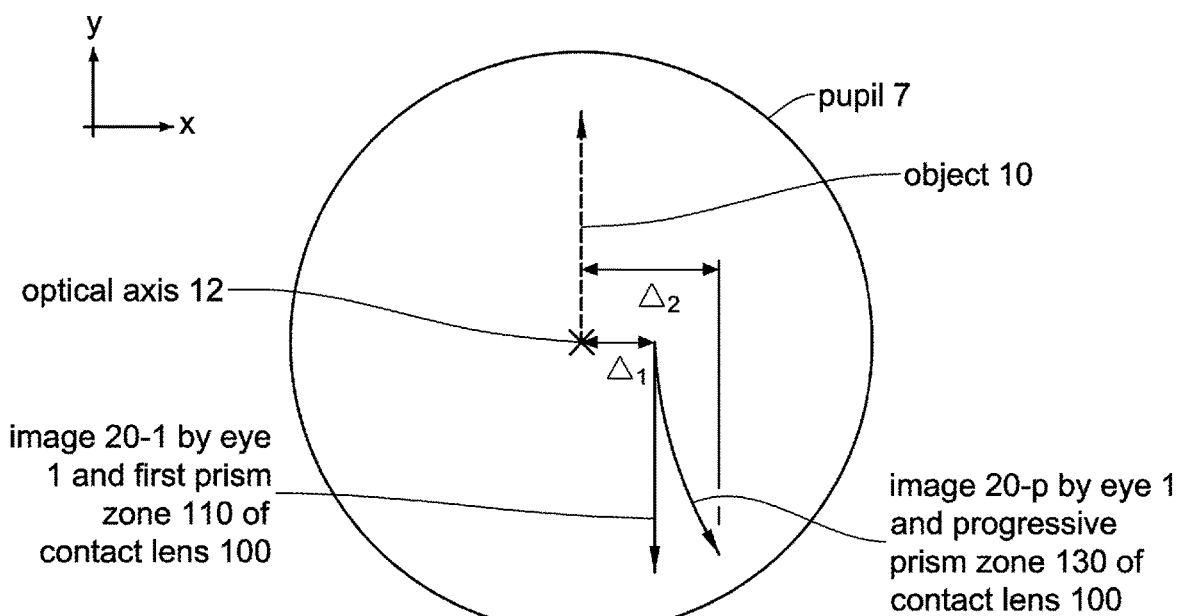

FIG. 6B illustrates that such a progressive prismatic contact lens 100 images with its central first prism zone 110 an upward-pointing linear target 10 into a downward-pointing line-like image 20-1, shifted horizontally along the x-axis by $\Delta_1$, proportional to the first prismatic power. Further, the prismatic contact lens 100 can create an additional downward-pointing bent image 20-*p* by the progressive prism zone 130, whose endpoint is shifted by $\Delta_2$, proportional to the second prismatic power. This figure captures a marked aspect of the optics of the progressive prismatic contact lens 100.

Figure 6C:
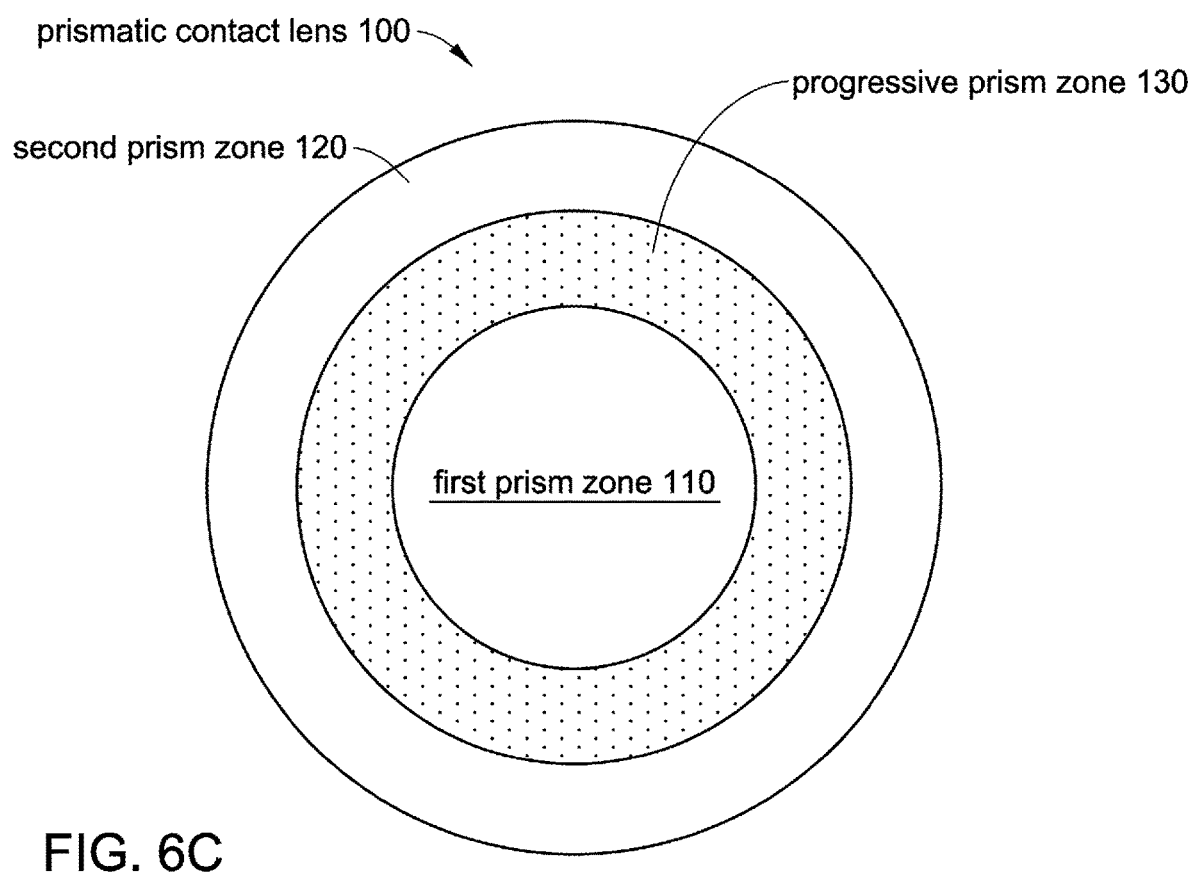
FIG. 6C illustrates a progressive prismatic contact lens with a second prism zone.

FIG. 6C illustrates that such progressive prismatic contact lenses 100 can have the additional second prism zone 120, adjacent to the progressive prism zone 130, having the second prism and a second optical power. The second prism zone 120 can be a ring, or an annuus, around the progressive prism zone 130. Such a prismatic contact lens 100 can be formed without creating a visible, undesirable sharp transition line 121 between its prismatic zones 110 and 120, as the progressive prism of the progressive prism zone 130 can smoothly interpolate between the first prism of the first prism zone 110 and the second prism of the second prism zone 120.

In a noteworthy embodiment, the first prism zone 110 in a central circular region, combined only with the progressive prism zone 130 as a ring, or annular region, around the central circular region, can already deliver useful medical benefits without having the separate, second prismatic zone 120, as shown in FIGS. 6A-B.

In some embodiments, the prismatic power of the first prism can be in the 0.25-5 (prism) D range, while the prismatic power of the second prism can be in the 0.75-7 (prism) D range. In some other embodiments, the prismatic power of the first prism can be in the 0.25-1.5 (prism) D range, while the prismatic power of the second prism can be in the 0.5-2 (prism) D range.

In some embodiments, the first optical power can be consistent with distance vision, and the second optical power can be consistent with near vision. These embodiments are bifocal and bi-prismatic at the same time.

In some embodiments, a difference between the first optical power and the second optical power can be less than 0.5 D. In some cases, the first and second optical powers can be essentially the same. Such lenses can be characterized as monofocal and bi-prismatic, or monofocal with a progressive prism. Since the sources of presbyopia and eye-strain can be quite distinct, a substantial fraction of patients may develop eye-strain before developing presbyopia, and thus may need such monofocal and bi-prismatic/progressive prismatic lenses.

As discussed, the different types of asthenopia are associated with different vision modalities. Convergence insufficiency can be associated with refractive challenges or shortcomings specifically in the nasal-temporal direction. These can be alleviated efficiently with a "horizontal prism", i.e. with a prism that has an apex along the y-axis, and thus has a refraction direction along the x-axis. In progressive prismatic implementations, this horizontal prism can vary vertically, along the y-axis. If the additional feature of enhanced nasal prism is desired only in a lower nasal quadrant, instead of the entire lower half of the prismatic contact lens 100, then, however, the prism can vary progressively along a tilted meridian, along a non-vertical line that makes an angle with the y-axis, such as a line that is tilted towards the lower nasal quadrant.

Proprioceptive overstimulation is associated with the lack of synchronism between the central vision and the peripheral vision. This condition may be alleviated by a prism that varies progressively in a radial direction, or with an increasing radius.

Articulated in general terms, in embodiments of the prismatic contact lens 100, the progressive prism can be progressive in the context of its prismatic power, or its prism refraction direction, or both. In some embodiments, the prismatic power may vary progressively, while the refraction direction remains steady through the progressive prism zone 130. In other embodiments, the prismatic power may remain unchanged, but its refraction direction may vary progressively through the progressive prism zone 130. Finally, in some embodiments, both the prismatic power and the refraction direction may vary progressively. The progressive variations of the prismatic power and the refraction direction can be independent from each other in some embodiments. In others, they can follow a predetermined mathematical relation.

In some embodiments of the prismatic contact lens 100, the prismatic power of the progressive prism can vary progressively in a radial direction, with an increasing radius, along an x-axis, along a y-axis, or along a tilted meridian, making an angle with the x-axis and the y-axis.

In some embodiments of the prismatic contact lens 100, the prism refraction direction of the progressive prism can vary progressively in a radial direction, with an increasing radius, along an x-axis, along a y-axis, or along a tilted meridian, making an angle with the x-axis and the y-axis.

In a class of embodiments, the overall prism can be designed as a combination, or superposition, of a y-directionally progressive and a radially progressive prism, or some other combination of the previously described prismatic effects. Such combination prismatic contacts lenses can address and alleviate more than one sources of asthenopia.

In some embodiments, at least one of the prism refraction direction of the first prism, the prism refraction direction of the progressive prism, and the prism refraction direction of the second prism may be tilted relative to the horizontal, x-axis.

Figure 7A:
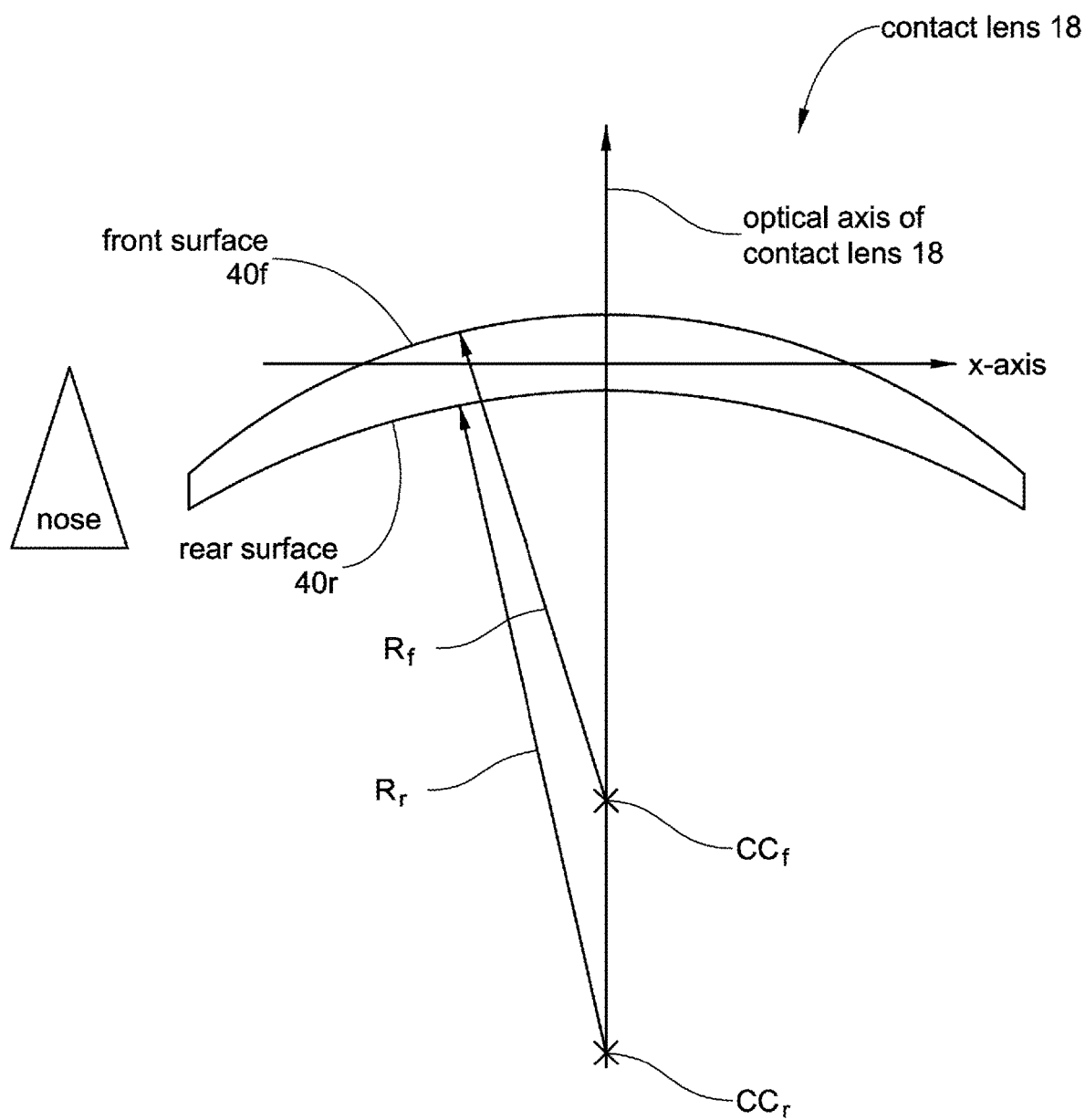
FIGS. 7A-B illustrate off-axis centers of curvatures in some embodiments of the prismatic contact lens.
Figure 7B:
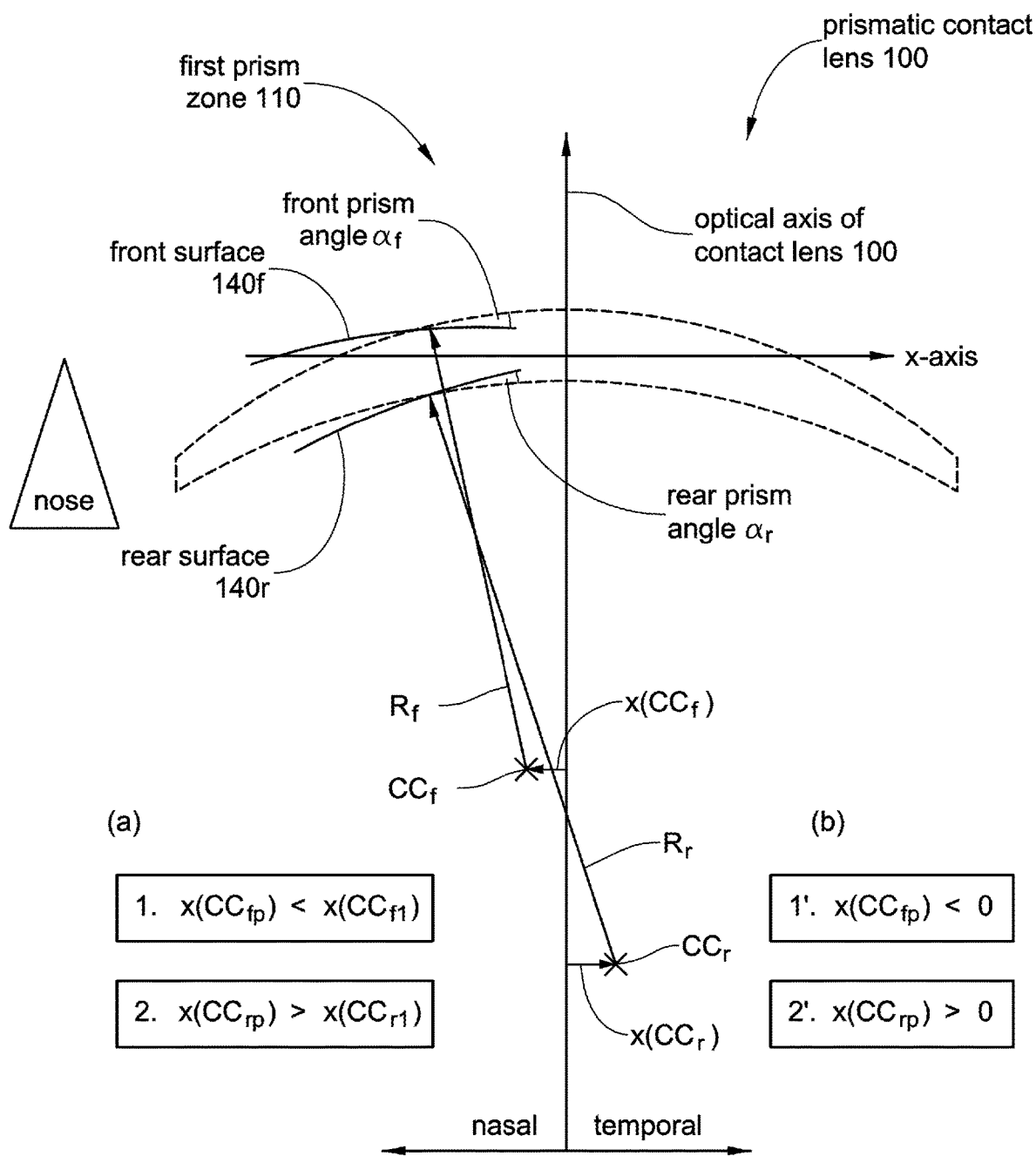

FIGS. 7A-B illustrate another way to characterize and recognize the presence of a prismatic effect in a contact lens. The shown embodiments can be characterized via a description of the curvatures of the lens surfaces and the off-center locations of their corresponding centers of curvatures.

In some detail, embodiments of the contact lens in general can have a central normal of the contact lens that defines a z-axis 3, or optical axis 12. The central zone of the contact lens can further define a tangential, centered x-y plane. The z-axis 3 and the x-y plane together define an x-y-z coordinate system.

FIG. 7A illustrates, as a baseline comparison, that a non-prismatic contact lens 18 can be a meniscus lens with a non-negative optical power, having a front surface 40$f$ with a radius of curvature $R_f$ and a center of front surface curvature $CC_f$, and a rear surface 40$r$ with a radius of curvature $R_r$ and a center of rear surface curvature $CC_r$. In this baseline, non-prismatic contact lens 18, the centers of curvature $CC_f$ and $CC_r$ are on the optical axis 12/z-axis 3 of the contact lens 18.

FIG. 7B illustrates that a prismatic contact lens 100 can have a front surface 140$f$ with a radius of curvature $R_f$ and a center of front surface curvature $CC_f$, and a rear surface 140$r$ with a radius of curvature $R_r$ and a center of rear surface curvature $CC_r$ that are off the z-axis 3 because the front surface 140$f$ makes a front prism angle $\alpha_f$ with the front surface 40$f$ of the corresponding non-prismatic contact lens 18; and the rear surface 140$r$ makes a rear prism angle $\alpha_r$ with the rear surface 40$r$ of the corresponding non-prismatic contact lens 18.

The location of the centers of curvature CC relative to the z-axis is a well-defined way to characterize the prism in a lens. Since the prism of the prismatic contact lens 100 is varying from zone to zone, the curvatures of the first, progressive, and second prism zones are determined separately. Embodiments of the prismatic contact lens 100 can be described by an x-coordinate of the center of front surface curvature $x(CC_{fp})$ of the progressive prism zone 130 being nasal relative to an x-coordinate of the center of front surface curvature $x(CC_{f1})$ of the first prism zone 110; or an x-coordinate of the center of rear surface curvature $x(CC_{rp})$ of the progressive prism zone 130 being temporal relative to an x-coordinate of the center of rear surface curvature $x(CC_{rp})$ of the first prism zone 110, or both. Here the indices "1" and "p" were added to indicate that the centers of curvatures corresponded to the first prism zone 110, or to the progressive prism zone 130.

The above attributes can be expressed via inequalities by defining the directionality of the x-axis to point away from the nose, such that points farther from the nose (in FIG. 7B to the right) have greater x coordinates than points closer to the nose (in FIG. 7B to the left). With this directionality, the above characterizations can be written that at least one, possibly both inequalities hold for embodiments of the prismatic contact lens 100:

$$x(CC_{fp}) < x(CC_{f1}), \text{ or} \tag{1}$$

$$x(CC_{rp}) > x(CC_{r1}). \tag{2}$$

Here, the centers of front and rear surface curvatures $CC_{fp}$ and $CC_{rp}$ of the progressive prism zone 130 may not be single points. Instead, they may progress and cover an interval as the progressive prism zone 130 is traversed. The inequalities (1)-(2) hold for the points along this interval. Analogous inequalities relate the centers of curvature $CC_{f2}$ and $CC_{r2}$ of the second prism zone 120 to those of the first prism zone 110.

In some typical embodiments, the first prism may be zero, as the central, distance vision first prism zone 110 may not need a refractive prism. In such embodiments, the $CC_{f1}$ front and $CC_{r1}$ rear centers of curvature of the front and rear surfaces 140$f$ and 140$r$ of the first prism zone 110 can be located on the z-axis 3, and therefore, their x coordinates can be zero. In formal terms, $x(CC_{f1}) = x(CC_{r1}) = 0$. In such embodiments of the prismatic contact lens 100, $x(CC_{fp})$, the x-coordinate of the center of the front surface curvature $CC_{fp}$ of the progressive prism zone 130 being nasal relative to the z-axis 3 of the coordinate system can be written as:

$$x(CC_{fp}) < 0, \text{ and} \tag{3}$$

$x(CC_{rp})$, the x-coordinate of the center of rear surface curvature of the progressive prism zone 130 being temporal relative to the z-axis 3 of the coordinate system can be written as:

$$x(CC_{rp}) > 0. \tag{4}$$

In general, embodiments of the prismatic contact lens 100 are "off-axis center of curvature" lenses. In some context, the prism created by the centers of curvatures being offset according to the above inequalities is referred to as a "base-in prism", as the created prism's base is directed toward the inner center, the nose of the wearer.

The above-described coordinates and x-distances of the centers of curvature $x(CC_{f1})$, $x(CC_{f1})$, $x(CC_{fp})$, and $x(CC_{rp})$ can be determined with specialized tools and devices, such as spherometers and lens profilometers.

The optical powers of the different prism zones 110, 120, and 130 of the prismatic contact lens 100 can be engineered using the lensmaker's equation $f(R_1, R_2)=(n-1)(1/R_1-1/R_2)$ for thin lenses, and its appropriate extensions for thicker lenses. These relations assume that the centers of curvatures are on the main optical axis of the lens. As discussed above, a small prismatic refraction can be introduced into embodiments of the prismatic contact lens 100 by tilting the lens surfaces and thus moving the centers of curvature off the optical axis without impacting the optical performance of the contact lens negatively. In other words, in leading approximation, the optical powers and the prismatic powers of the various zones of the prismatic contact lens 100 can be tuned independently from each other.

Figure 8A:
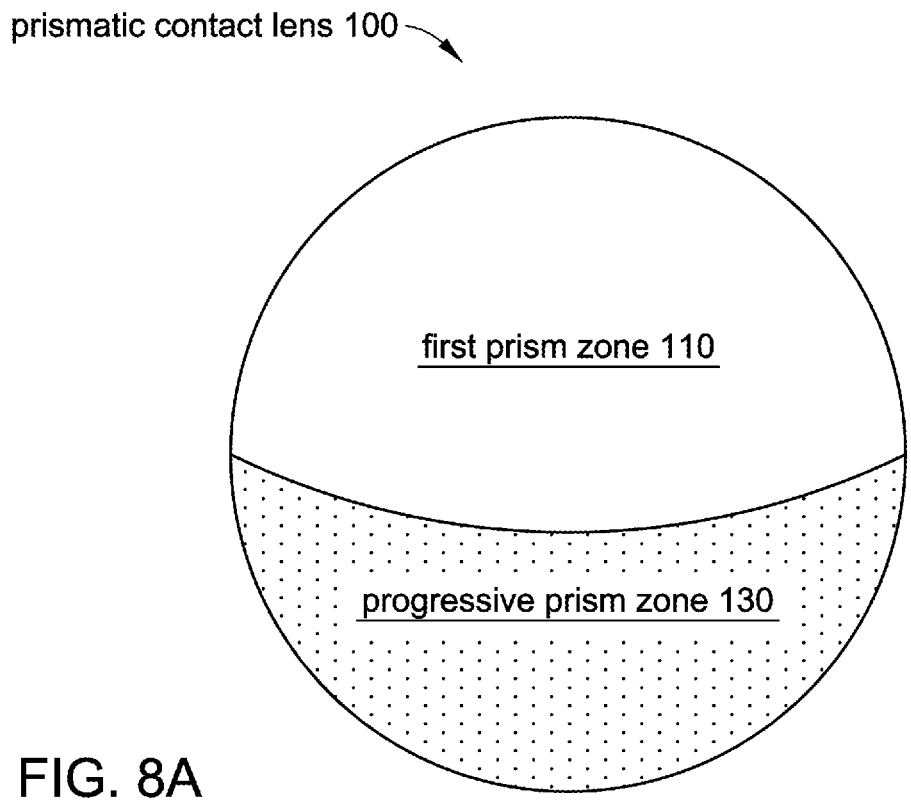
FIGS. 8A-C illustrate a prismatic contact lens with top-bottom prism zones.
Figure 8B:
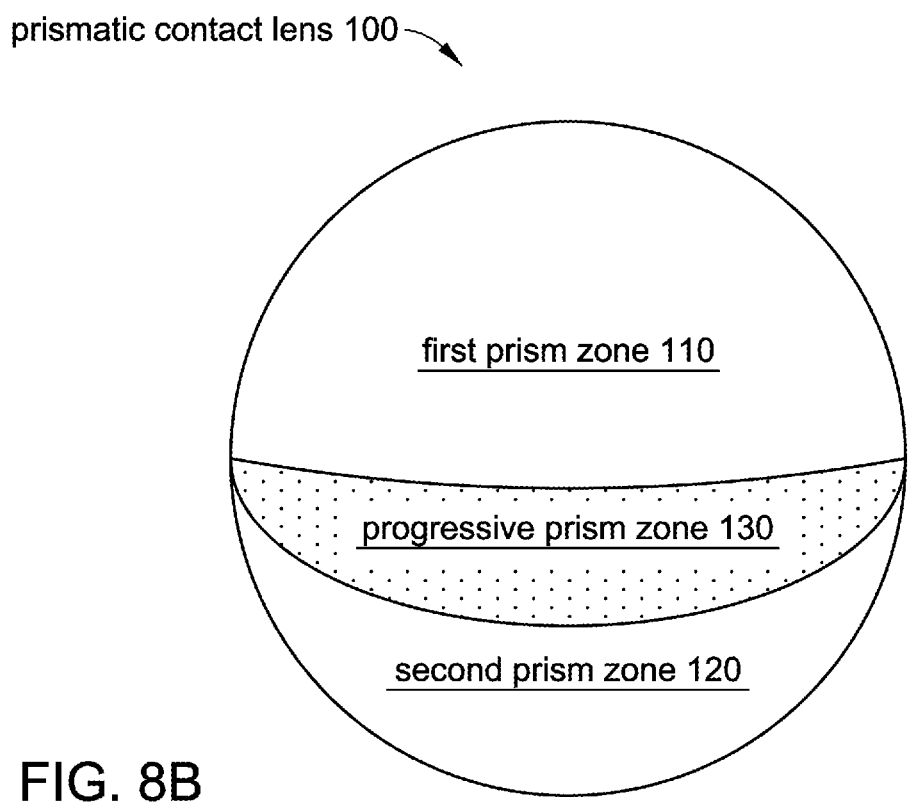

FIGS. 8A-B illustrate another class of embodiments of the prismatic contact lens 100, where the first prism zone 110 can include an upper region of the prismatic contact lens 100; and the progressive prism zone 130 can include a lower region of the prismatic contact lens 100. Such embodiments bear closer resemblance to the lenses of the "top-bottom", or "D-segment" designs of bifocal progressive glasses.

FIG. 8B illustrates that in some embodiments the prismatic contact lens 100 can include a second prism zone 120, where the first prism zone 110 includes an upper region of the prismatic contact lens 100, the progressive prism zone 130 includes a middle region of the prismatic contact lens 100, and the second prism zone 120 includes a lower region of the prismatic contact lens 100. As discussed above, such designs may be useful for prismatic contact lenses 100 where the first prism zone 110 has an optical power consistent with distance vision, while the second prism zone 120 has an optical power consistent with near vision.

Figure 8C:
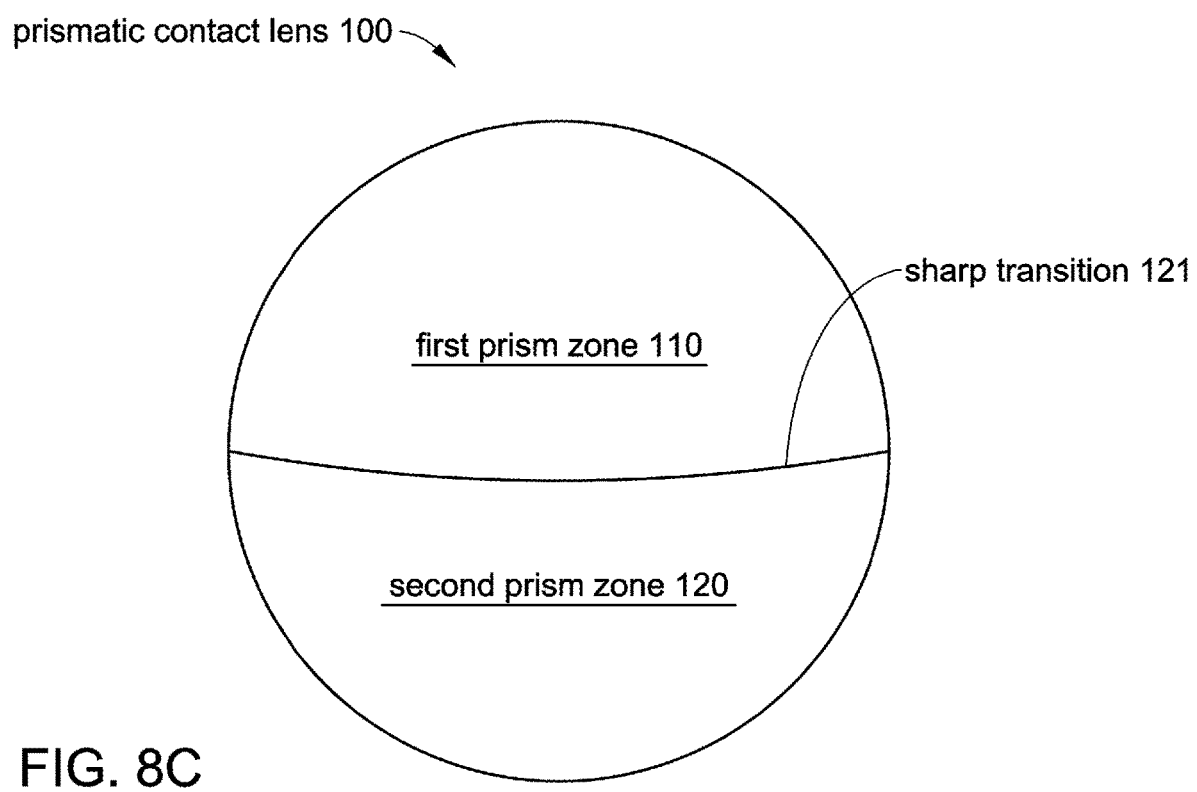

FIG. 8C illustrates an embodiment without a progressive prism zone 130: it only contains a first prism zone 110 and a second prism zone 120, separated by a sharp transition 121.

Figure 9A:
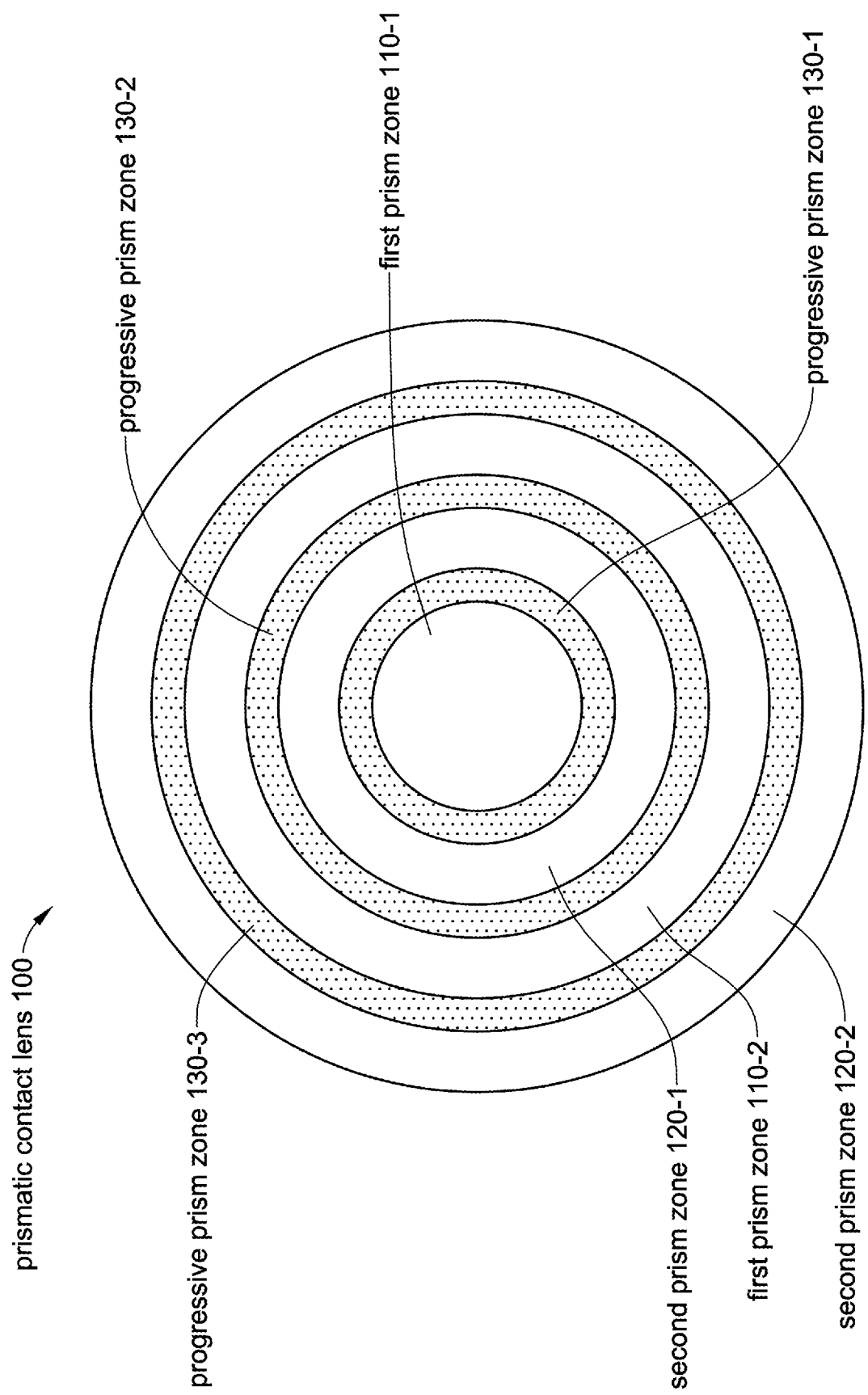
FIGS. 9A-B illustrate multi-zone prismatic contact lenses with prism rings.

FIG. 9A illustrates another class of embodiments of the prismatic contact lens 100. These embodiments are called multi-zone prismatic contact lenses 100 that can include first prism zones 110-1, 110-2, ..., collectively referenced as 110-$i$ (that include the first prism zone 110), having a first prism and a first optical power. These multi-zone lenses 100 can also include progressive prism zones 130-1, 130-2, ..., collectively referenced as 130-$i$ (that include the progressive prism zone 130), having a progressive prism that varies from the first prism to a second prism. Finally, they can include second prism zones 120-1, 120-2, having the second prism and a second optical power. Multi-zone contact lenses in general can reduce astigmatism and other aberrations relative to contact lenses with fewer zones.

FIG. 9A illustrates the particular embodiment of the multi-zone prismatic contact lens 100, wherein the first prism zones 110-$i$ include a central region and first prism rings; the progressive prism zones 130-$i$ include progressive prism rings; and the second prism zones 120-$i$ include second prism rings.

Figure 9B:
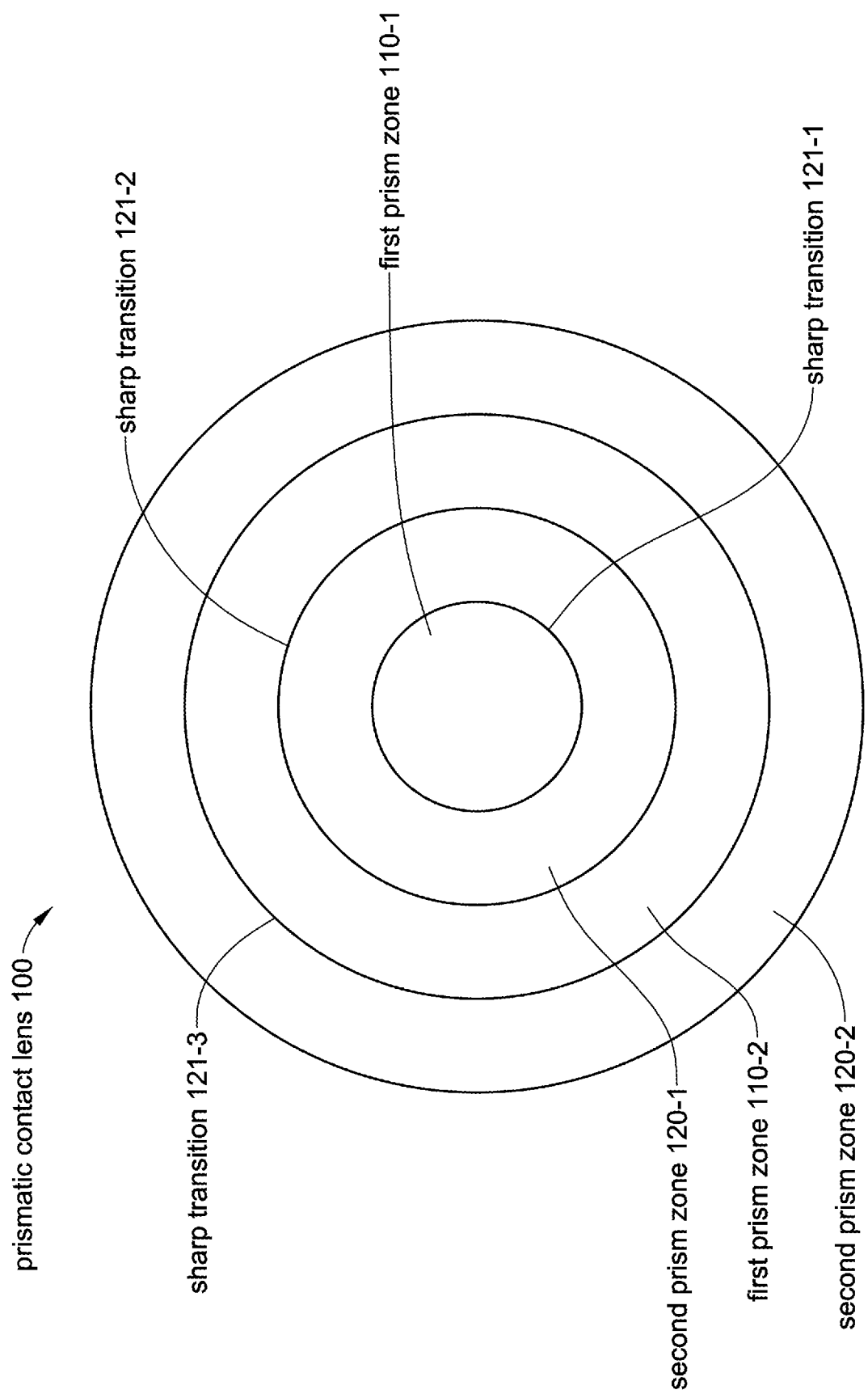

FIG. 9B, in analogy to FIG. 5A and FIG. 8C, illustrates the related embodiment where the multi-zone prismatic contact lens 100 does not have the progressive prism zones 130-$i$, and thus the first prism zones 110-$i$ are separated from the second prism zones 120-$i$ by sharp transitions 121-$i$. General features of these "sharp-transition embodiments" will be discussed below in more detail.

Figure 10A:
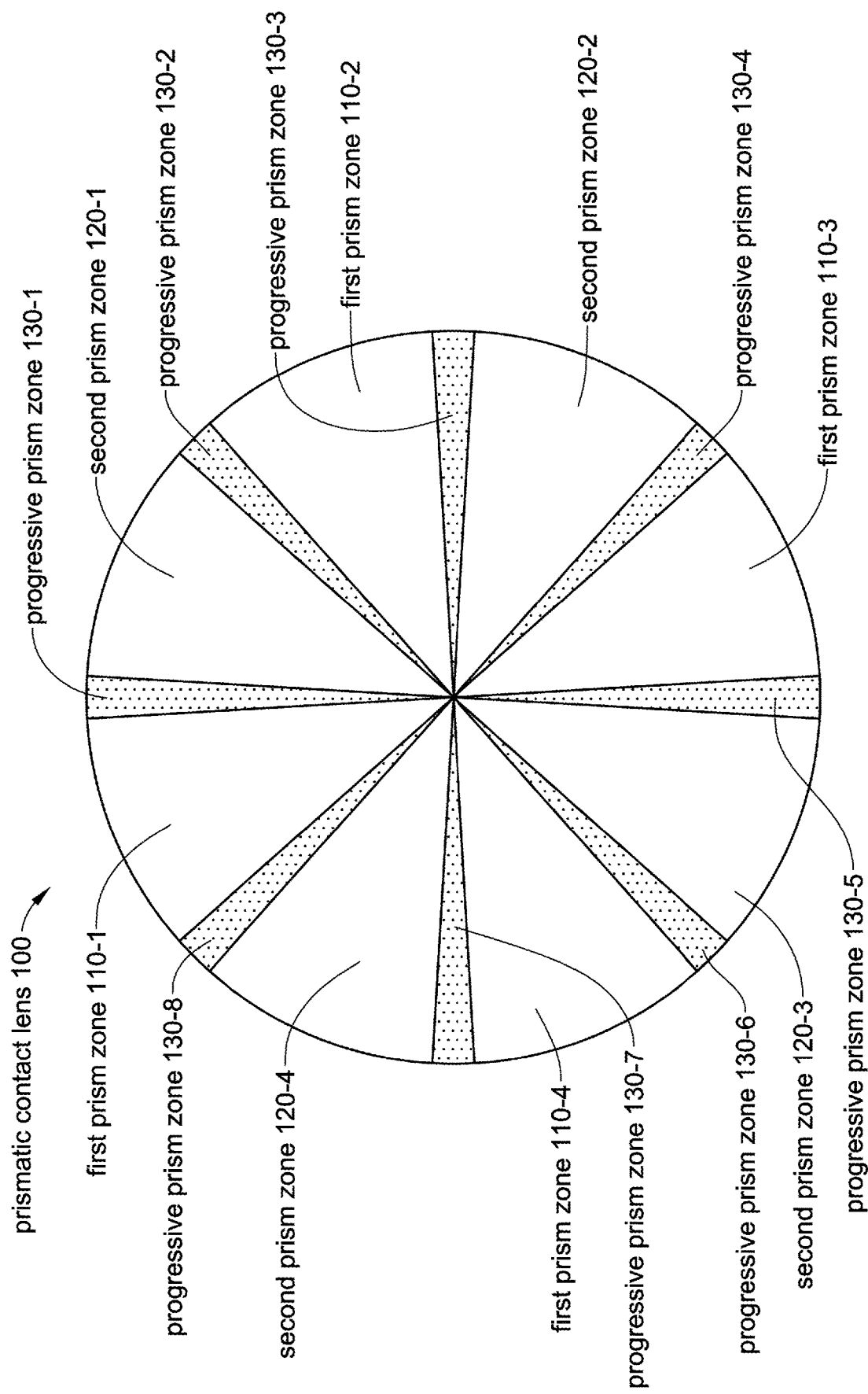
FIGS. 10A-B illustrate multi-zone prismatic contact lenses with prism segments.

FIG. 10A illustrates yet another embodiment of multi-zone prismatic contact lenses 100, wherein the first prism zones 110-$i$ can include radial first prism zone segments, the progressive prism zones 130-$i$ can include radial progressive prism zone segments; and the second prism zones 120-$i$ can include radial second prism zone segments. As before, such multi-zone embodiments may reduce astigmatism and aberrations relative to embodiments that have only single zones 110, 120, and 130.

Figure 10B:
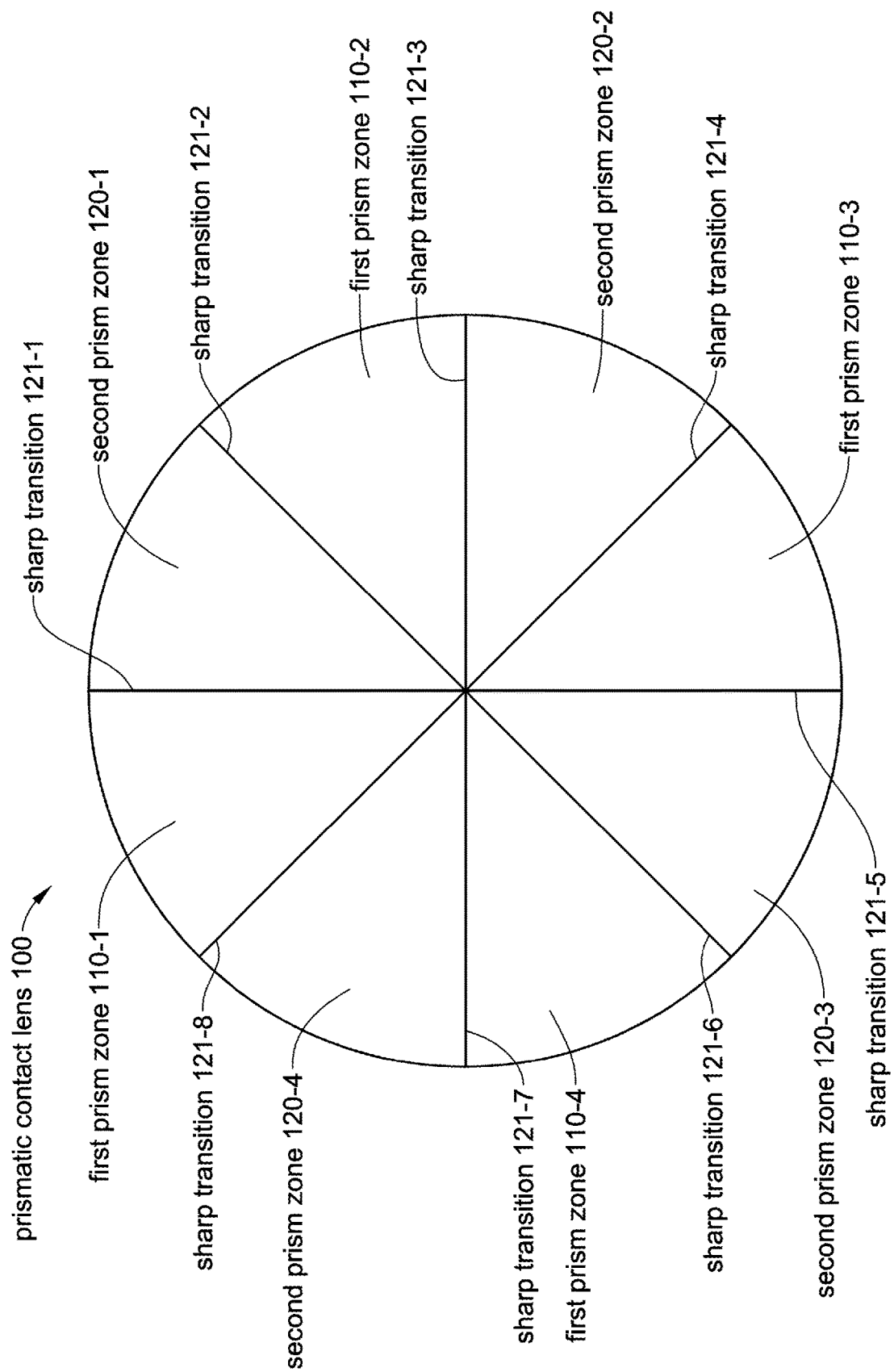

FIG. 10B illustrates an analogous "sharp transition" embodiment, where the radial first zone segments 110-$i$ are separated from the radial second zone segments 120-$i$ only by sharp transitions 121-$i$.

Figure 11A:
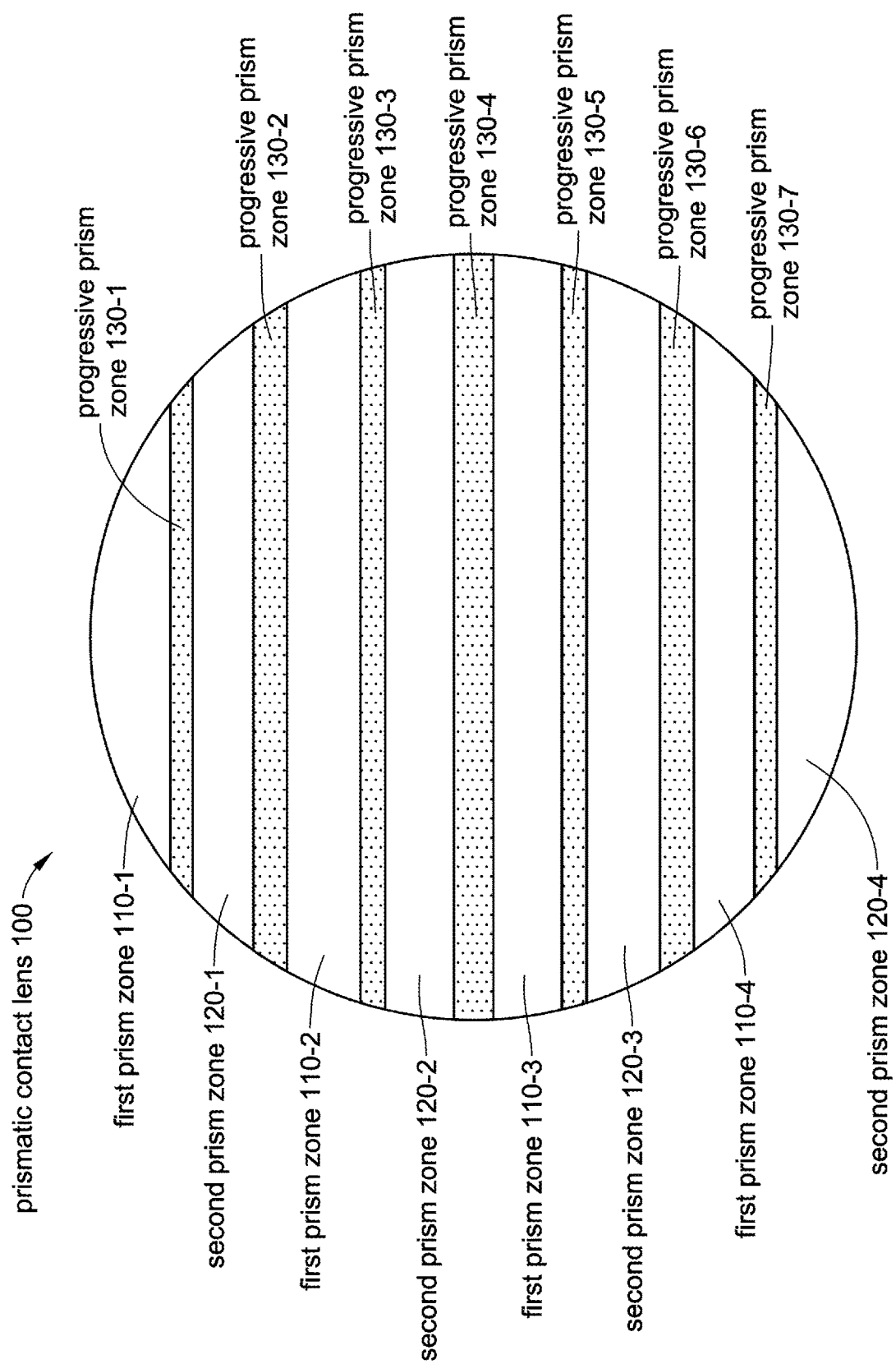
FIGS. 11A-B illustrate multi-zone prismatic contact lenses with prism strips.

FIG. 11A illustrates that, in yet another class of the multi-zone prismatic contact lenses 100, the first prism zones 110-$i$ can include horizontal first prism zone strips; the progressive prism zones 130-$i$ can include horizontal progressive prism zone strips; and the second prism zones 120-$i$ can include horizontal second prism zone strips.

Figure 11B:
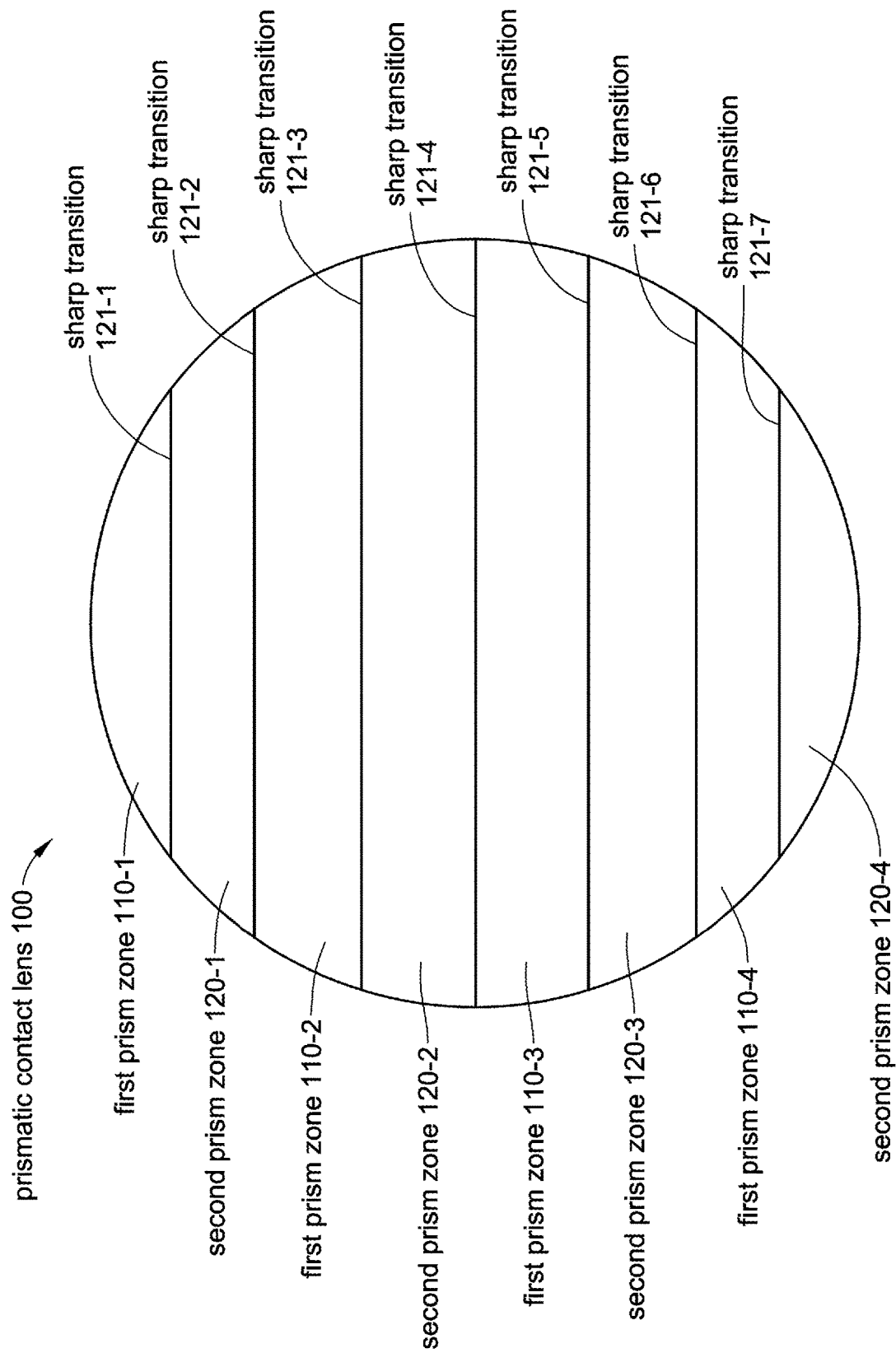

FIG. 11B illustrates that in an analogous "sharp transition" embodiment, the first prism zone strips 110-$i$ may be adjacent to the second prism zone strips 120-$i$ without intervening progressive prism zone strips 130-$i$, only separated by sharp transitions 121-$i$.

FIGS. 12 A-B illustrate further embodiments of the prismatic contact lens 100, which are less symmetric than the previously described designs. FIG. 12A illustrates an embodiment, where the progressive prism zone 130 is in the lower nasal quadrant, in an off-center arrangement. FIG. 12B illustrates a design where the progressive prism zone 130 transitions into a second prism zone 120, even further off center in the lower nasal quadrant. As mentioned before, these designs have connections to the bifocal lenses that offer a near-vision optical power in the lower nasal quadrant.

To extend the scope of the overview of possible embodiments, we return to the embodiments that have a sharp transition 121. As mentioned, these embodiments may have a less desirable visible transition line, but their visual space does not include a progressive zone where the prism and optical power may be varying—a feature, which may be preferred by a fraction of the patients. The progressive prism contact lenses 100 of FIG. 6C, and the sharp transition contact lenses 100 of FIG. 5A may each be adopted by a segment of the overall patient population, as they offer distinct medical benefits.

The sharp-transition prismatic contact lenses 100 include the embodiment of FIG. 5A that shows a prismatic contact lens 100, with a first prism zone 110, having a first prism and a first optical power; a second prism zone 120, adjacent to the first prism zone 110, having a second prism and a second optical power; and a sharp transition 121 between the first prism zone 110 and the second prism zone 120. In these prismatic contact lenses 100, the first prism zone 110 can be a central circular region; and the second prism zone 120 can include an annulus, or ring, around the central circular region, as shown in FIG. 5A.

The simplest prismatic contact lens may address eyestrain symptoms by including a prism in its central zone, and no prism in its peripheral zone. Next, several embodiments will be described that go beyond this simplest contact lens design, providing distinct additional medical benefits.

(1) In some embodiments of the sharp transition prismatic contact lens 100, both prism zones have prisms: the first prism zone 110 has a non-zero first prism, and the second prism zone 120 has a non-zero second prism. These embodiments of the prismatic contact lens 100 are capable of reducing the fixation disparity by refracting the central and the peripheral vision with different prismatic powers. The separately tunable prismatic powers of the two prism zones substantially enlarge the number of possible options the optometrist can employ to reduce the asthenopia symptoms of the patients.

(2) In another class of embodiments, at least one of a refraction direction of the first prism and a refraction direction of the second prism may be different from horizontal. These embodiments further broaden the design space in which the medical outcomes can be optimized. For example, tilted, non-horizontal prism refraction directions may be useful in the lower nasal quadrant, optimized for the optical ray tracing of a near vision use of the prismatic contact lens 100.

In the prismatic contact lenses 100 that combine the classes of embodiments of (1) and (2), the prismatic powers and the refraction directions of the first prism and the second prism are tunable independently. These prismatic contact lenses 100 greatly enlarge the number of possible options at the disposal of the optometrist to reduce the asthenopia symptoms of the patients.

(3) Further, in some embodiments of the prismatic contact lens 100, the symptoms of asthenopia that originate from the fixation disparity related to the peripheral vision, can be alleviated by adding a prism only to the peripheral, second prism zone, while having approximately no prism in the central, first prism zone.

To summarize, the above (1)-(3) embodiments of the prismatic contact lens 100 offer substantial additional medical benefits over the simplest prism contact lens design.

FIG. 8C illustrates an embodiment of the prismatic contact lens 100, where the first prism zone 110 can include an upper region of the prismatic contact lens 100, and the second prism zone 120 can include a lower region of the prismatic contact lens 100.

Finally, embodiments of the prismatic contact lens 100 can include a multi-zone prismatic contact lens 100 in general that includes first prism zones 110-$i$, including the first prism zone, having the first prism and the first optical power; second prism zones 120-$i$, having the second prism and the second optical power: and sharp transitions 121-$i$, between the first prism zones 110-$i$ and the second prism zones 120-$i$.

FIG. 9B illustrates that particular examples include the prismatic contact lens 100, where the first prism zones 110-$i$ include a central region and first prism rings; and the second prism zones 120-$i$ include second prism rings, separated by sharp transitions 121-$i$.

FIG. 10B illustrates that in some embodiments of the prismatic contact lens 100 the first prism zones 110-$i$ can be radial first prism zone segments; and the second prism zones 120-$i$ can include radial second prism zone segments, the two separated by sharp transitions 121-$i$.

FIG. 11B illustrates that in some embodiments of the prismatic contact lens 100 the first prism zones 110-$i$ can include horizontal first prism zone strips; and the second prism zones 120-$i$ can include horizontal second prism zone strips, the two separated by sharp transitions 121-$i$.

Figure 12A:
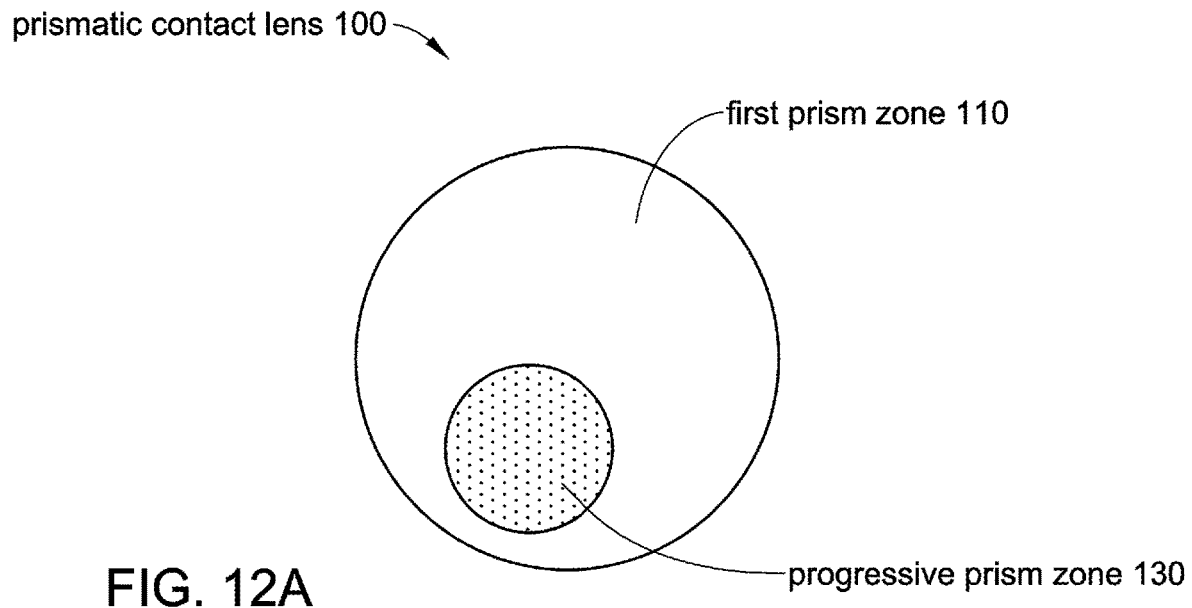
FIGS. 12A-D illustrate asymmetric progressive prism contact lens embodiments.
Figure 12B:
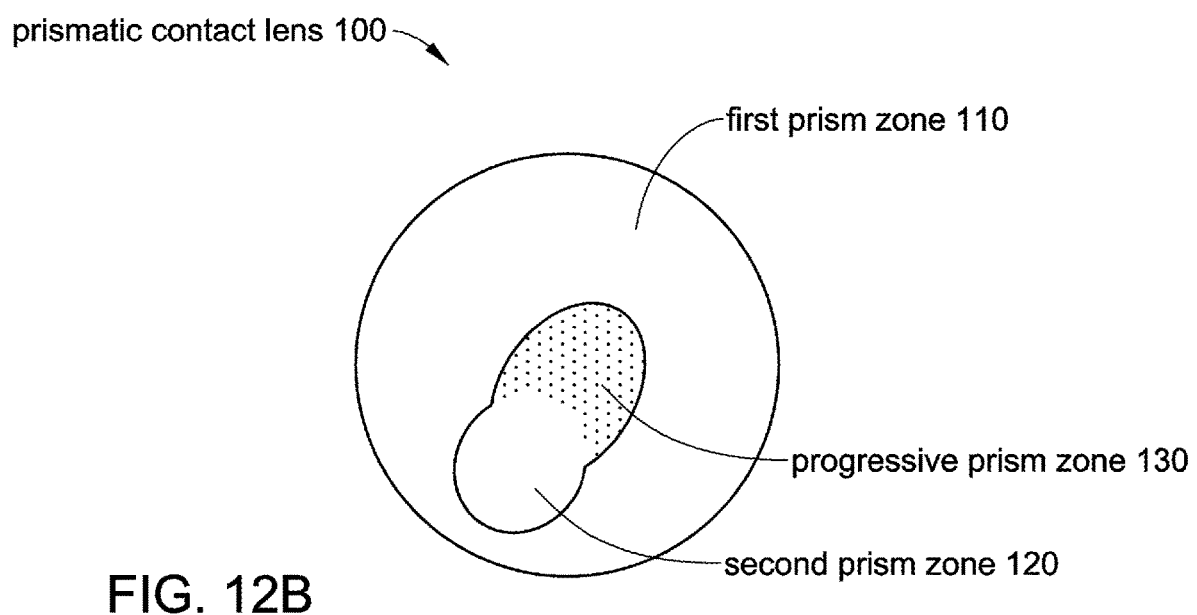
Figure 12C:
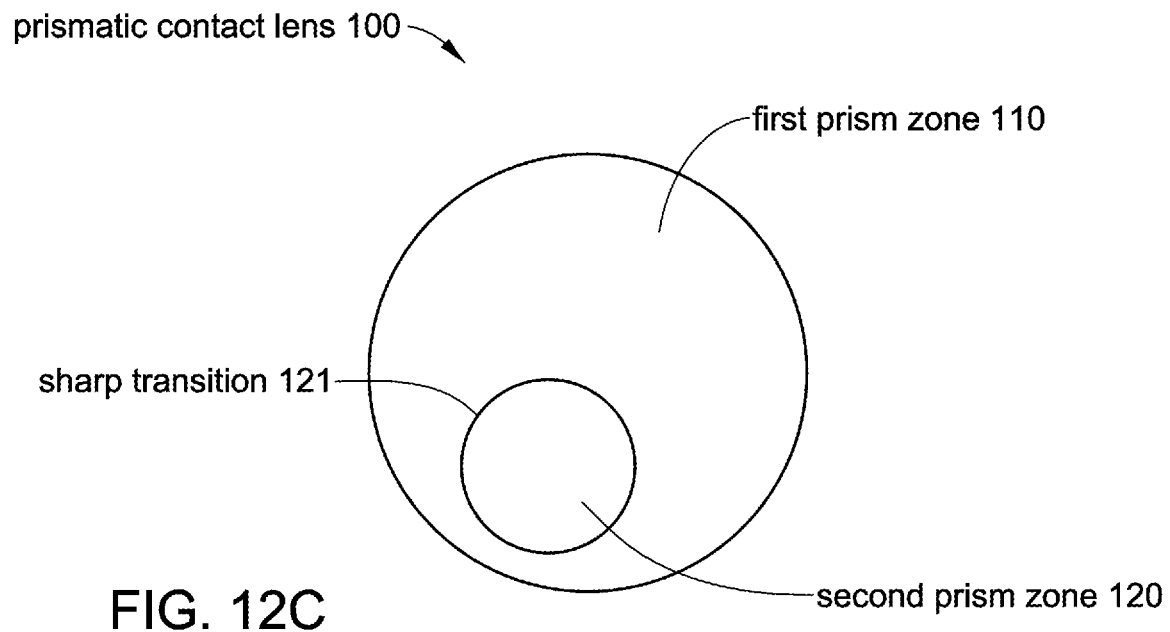
Figure 12D:
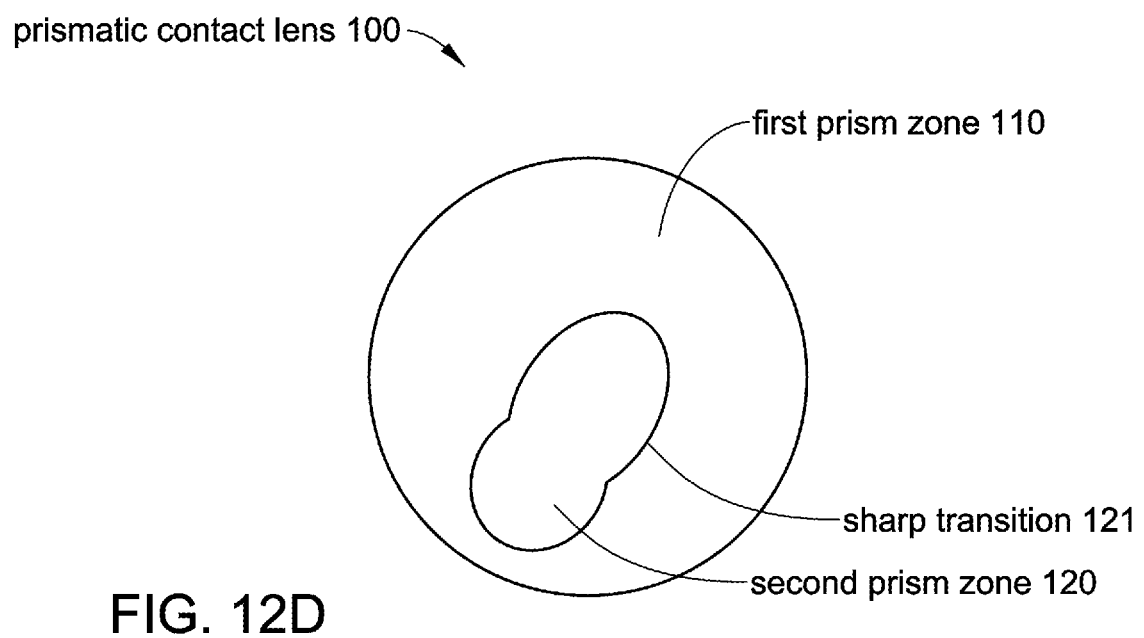

Finally, FIGS. 12C-D illustrate prismatic contact lenses 100 where the second prismatic zone 120 is asymmetric, extending in the direction of the lower nasal quadrant, and it is connected to the first prismatic zone 110 with a sharp transition 121, without a progressive prism zone 130.

As summarized above, these two-zone, sharp transition prismatic contact lenses 100 can have the medical benefit of larger fraction of their area having well-defined radius of curvature, a feature that a fraction of the patients may find sufficiently valuable to make up for the visible transition line.

FIG. 13 is a comprehensive table to illustrate the earlier stated principle that the optical powers and the prismatic powers of the prismatic contact lens 100 can be engineered independently, within some limits. The Table of FIG. 13 shows in its column headers the previously described prism designs: zero prism, single-prism zone (e.g. FIGS. 4A-B), concentric two-prism zones with sharp prism transition between (e.g. FIGS. 5A-B), concentric two-prism zones with progressive prism transition between them (e.g. FIG. 6C), top-and-bottom prism zones with sharp prism transition in between (e.g. FIG. 8C), top-and-bottom prism zones with progressive prism transition in between (e.g. FIG. 8B), and multi-zone prisms (FIGS. 9A-B, 10A-B, and 11A-B). Additional prism embodiments are also part of the comprehensive list, and were not shown expressly only because of space limitations.

They include the designs, where the first prism zone 110 is combined only with the progressive prism zone 130, as in FIGS. 6A-B, and FIGS. 8A-B. The comprehensive list also includes the asymmetric designs, such as the ones in FIGS. 12A-D. And finally, yet another class of embodiments is the prism lenses with a prism refraction direction not being directed horizontally, but at some angle with the x-axis.

Further, the row headers of the Table of FIG. 13 show the various designs for the optical power, including: zero power, concentric two-zone with sharp power transition, concentric two-zone with progressive power transition, top-bottom two-zone with sharp power transition, top-bottom two-zone with progressive power transition, and a variety of possible multi-zone optical power lenses.

In describing the components of the lenses, we articulated the transitions in more specificity, distinguishing prism transitions and optical power transitions. This was necessary because the power and prism can be largely designed independently. Therefore, a prismatic contact lens 100 can be designed with a progressive prism transition, yet with a sharp optical power transition, for example.

FIG. 13 illustrates that a large number of embodiments were contemplated based on the underlying principle of the prismatic contact lens 100, combined with various optical power lenses, wherein these two design drivers and the transitions between them can be varied largely independently.

Figure 14:
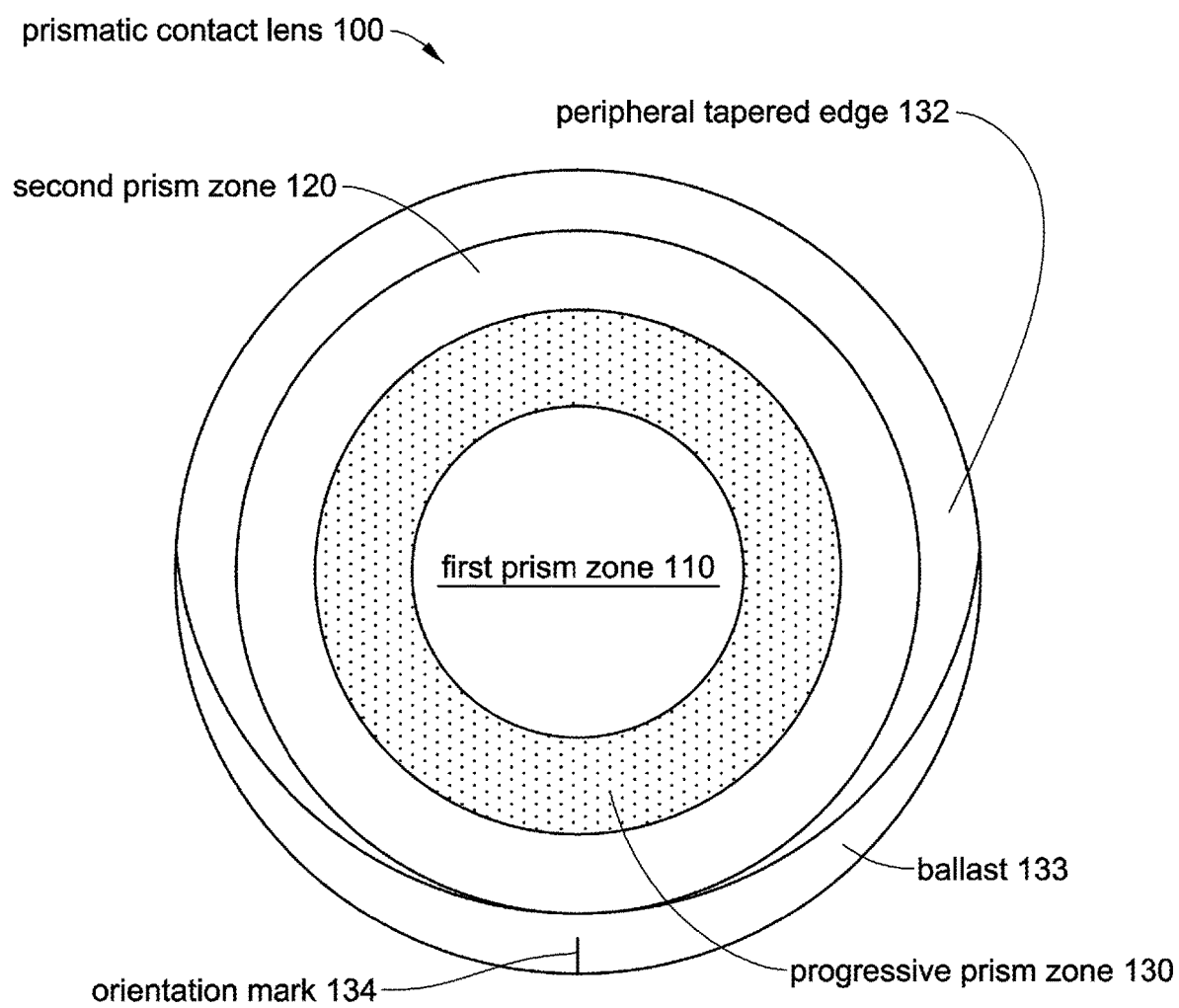
FIG. 14 illustrates a prismatic contact lens with ballast and orientation mark.
Figure 15B:
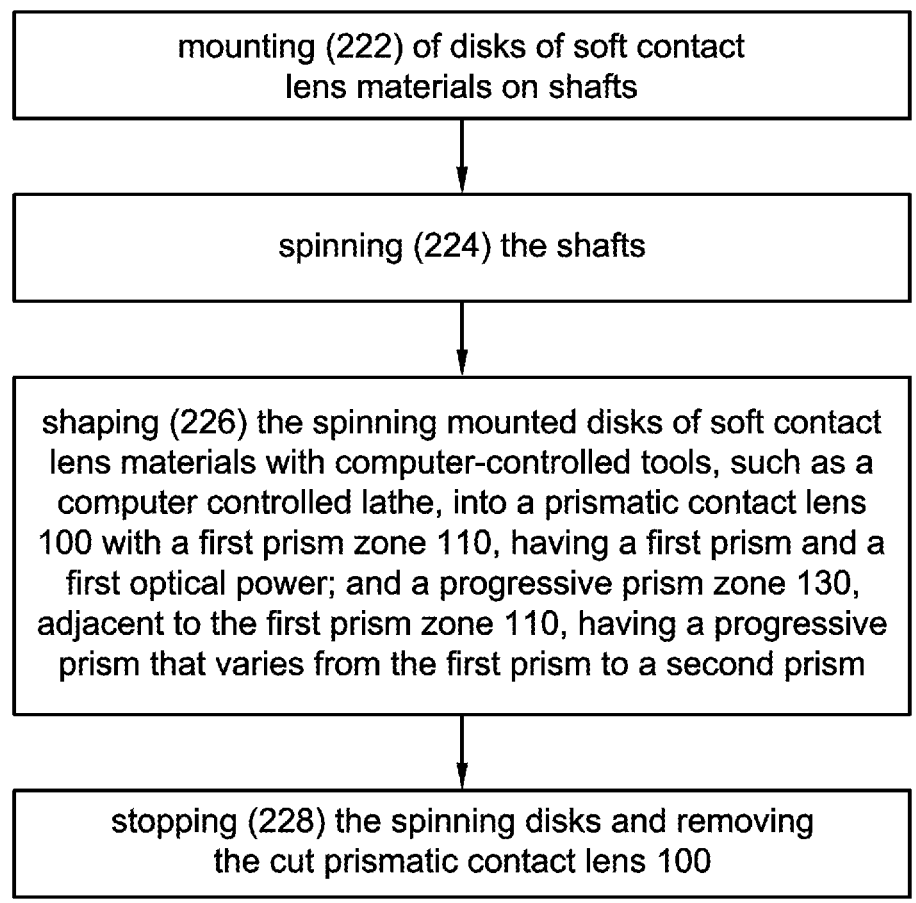

FIG. 14 illustrates further aspects of the prismatic contact lenses 100. Since directionality and orientation are important to orient the prism and its apex correctly, some embodiments can utilize stabilizing, or orienting, structures. For example, some embodiments of the prismatic contact lens 100 have at least one of a peripheral tapered edge 132, a thicker, or heavier, ballast 133 in a lower region of the prismatic contact lens 100, and an orientation mark 134. The extra weight of the ballast 133 will tend to rotate the prismatic contact lens 100 so that the ballast 133 will be positioned at the bottom of the prismatic contact lens 100.

This will orient the refraction direction of the prismatic contact lens 100 in the intended direction, typically along the x-axis, or close to it. Further, the orientation mark 134 can be used by the wearer to insert the prismatic contact lens 100 into the eye 1 with the correct, or prescribed, orientation.

Here a distinction is made. There has been a description of a contact lens with a "prism" before. However, the function of the described "prism" was not optical, or refractive. It was to serve as a ballast for the contact lens, analogous to the ballast 133 of FIG. 14. The different functionalities manifest themselves in different structures. The ballast "prism" has a horizontal prism apex, and its thicker base is oriented downward, in the negative y direction to serve as a ballast. While its optical performance is not the intended function, but rather, an unintended consequence, this ballast-prism refracts light in the vertical, positive y direction. In contrast, the here-described optical prisms of the prismatic contact lens 100 serve primarily an optical function, to refract the light in the nasal direction, along the x-axis. In broad terms, the roles of the x and y axes are interchanged between optical prisms and ballast "prisms", and therefore these two classes of prisms are different both for their function and for their structures, and thus constitute distinct classes.

Since the prismatic contact lenses 100 typically employ an orienting system, such as the ballast 133, they are capable of supporting other, orientation-dependent optical functions which regular, non-oriented contact lenses are unable to. One of these orientation-dependent optical functions is to correct various types of astigmatisms. These contact lenses are often referred to as toric lenses. Accordingly, in some embodiments of the prismatic contact lenses 100 at least one of the first prism zone 110 and the progressive prism zone 130 can also be toric. Any combination of optical power designs, and prismatic designs from the previous embodiments of FIGS. 5-14 can be additionally combined with toricity.

Finally, some embodiments of the prismatic contact lens 100 can include Freshnel-like sawtooth-shaped surfaces, or index-of-refraction modulations.

The material of the prismatic contact lenses 100 can be soft hydrogel, silicone hydrogel, any gas permeable material, or PMMA. Also, various hybrid designs that use more than one of the listed materials can be used. In some other embodiments, the prismatic contact lens 100 can be a harder material, which can be capable of floating on the tear film of the eye, and is kept in place by the top of the lower eye-lid. In the case of such hard contact lenses, the eye 1 can be able to rotate relative to the prismatic contact lens 100 to some degree, thus amplifying the benefit of the contact lens's separate prism zones 110, 120 and 130.

The type of the use of the prismatic contact lens 100 can be daily disposable, frequent replaceable, or reusable.

Finally, embodiments of the invention include a method 200 of making various embodiments of the prismatic contact lens 100. In some embodiments, the method 200 can include:
 providing (202) an injection mold, with the negative shape of a prismatic contact lens 100 with a first prism zone 110, having a first prism and a first optical power; and a progressive prism zone 130, adjacent to the first prism zone 110, having a progressive prism that varies from the first prism to a second prism;
 heating (204) a soft contact lens material to a molten contact lens material;
 injecting (206) the molten contact lens material into the injection mold to create a molded prismatic contact lens 100;
 cooling (208) the molded prismatic contact lens 100 by cooling the injection mold; and
 removing (210) the cooled, molded prismatic contact lens 100 from the injection mold.

Embodiments of an alternative method 220 can include:
 mounting (222) of disks of soft contact lens materials on shafts;
 spinning (224) the shafts;
 shaping (226) the spinning mounted disks of soft contact lens materials with computer-controlled tools, such as a computer controlled lathe, into a prismatic contact lens 100 with a first prism zone 110, having a first prism and a first optical power; and a progressive prism zone 130, adjacent to the first prism zone 110, having a progressive prism that varies from the first prism to a second prism; and
 stopping (228) the spinning disks and removing the cut prismatic contact lens.

Many additional steps of known methods of manufacturing a contact lens can be practiced in conjunction with the methods 200 and 220.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

The invention claimed is:

1. A prismatic contact lens, comprising:
 a first prism zone, having a first prism and a first optical power in a central circular region;
 a progressive prism zone, having a progressive prism that gradually varies from the first prism to a second prism in a ring around the central circular region; and
 a second prism zone, adjacent to the progressive prism zone, having the second prism and a second optical power in a ring around the progressive prism zone; wherein
 the prismatic contact lens has an orienting system to orient an x-axis and a y-axis of the prismatic contact lens when worn on an eye; and
 a refraction direction of at least one of the first prism and the second prism is oriented along the x axis, as oriented by the orienting system.

2. The prismatic contact lens of claim 1, wherein:
 a prismatic power of the progressive prism varies progressively at least one of
  in a radial direction, with an increasing radius, along an x-axis, along a y-axis, and along a tilted meridian, making an angle with the x-axis and the y-axis.

3. The prismatic contact lens of claim 1, wherein:
 a refraction direction of the progressive prism varies progressively at least one of in a radial direction, with an increasing radius, along an x-axis, along a y-axis, and along a tilted meridian, making an angle with the x-axis and the y-axis.

4. The prismatic contact lens of claim 1, wherein:
a prismatic power of the first prism is zero; and
a prismatic power of the second prism is non-zero.

5. The prismatic contact lens of claim 1, the orienting system comprising:
at least one of a peripheral tapered edge, a ballast in a lower region of the prismatic contact lens, and an orientation mark.

6. The prismatic contact lens of claim 1, wherein:
at least one of a prism refraction direction of the first prism, a prism refraction direction of the progressive prism, and a prism refraction direction of the second prism is tilted relative to the x-axis.

7. The prismatic contact lens of claim 1, wherein:
the first optical power is consistent with distance vision; and
the second optical power is consistent with near vision.

8. The prismatic contact lens of claim 1, wherein:
a difference between the first optical power and the second optical power is less than 0.5 D.

9. The prismatic contact lens of claim 1, wherein:
at least one of the first prism zone and the progressive prism zone is toric.

* * * * *